United States Patent
Salvestrini et al.

(10) Patent No.: US 12,016,096 B2
(45) Date of Patent: Jun. 18, 2024

(54) CONTROLLABLE-LOAD CIRCUIT FOR USE WITH A LOAD CONTROL DEVICE

(71) Applicant: Lutron Technology Company LLC, Coopersburg, PA (US)

(72) Inventors: Christopher J. Salvestrini, Allentown, PA (US); Ryan S. Bedell, Breinigsville, PA (US); Matthew V. Harte, Breinigsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 18/348,670

(22) Filed: Jul. 7, 2023

(65) Prior Publication Data

US 2023/0354488 A1 Nov. 2, 2023

Related U.S. Application Data

(63) Continuation of application No. 16/889,720, filed on Jun. 1, 2020, now Pat. No. 11,743,983, which is a
(Continued)

(51) Int. Cl.
*H05B 45/14* (2020.01)
*H02M 1/08* (2006.01)
(Continued)

(52) U.S. Cl.
CPC ............ *H05B 45/14* (2020.01); *H02M 1/082* (2013.01); *H02M 5/2576* (2013.01);
(Continued)

(58) Field of Classification Search
CPC .... H05B 45/14; H05B 45/10; H05B 45/3725; H05B 45/44; H05B 47/175; H02M 1/082; H02M 5/2576
See application file for complete search history.

(56) References Cited

U.S. PATENT DOCUMENTS

| 4,797,599 A | 1/1989 | Ference et al. |
| 5,209,560 A | 5/1993 | Taylor et al. |

(Continued)

FOREIGN PATENT DOCUMENTS

| CN | 1843061 A | 10/2006 |
| CN | 101513122 A | 8/2009 |

(Continued)

OTHER PUBLICATIONS

International Search Report and Written Opinion dated Feb. 28, 2011 in corresponding International Application No. PCT/US2010/057382.

(Continued)

*Primary Examiner* — Seokjin Kim
(74) *Attorney, Agent, or Firm* — Michael S. Czarnecki; Glen R. Farbanish; Philip N. Smith

(57) ABSTRACT

A load control device for controlling the amount of power delivered from an AC power source to an electrical load is operable to conduct enough current through a thyristor of a connected dimmer switch to exceed rated latching and holding currents of the thyristor. The load control device comprises a controllable-load circuit operable to conduct a controllable-load current through the thyristor of the dimmer switch. The load control device disables the controllable-load circuit when the phase-control voltage received from the dimmer switch is a reverse phase-control waveform. When the phase-control voltage received from the dimmer switch is a forward phase-control waveform, the load control device is operable to decrease the magnitude of the controllable-load current so as to conduct only enough current as is required in order to exceed rated latching and holding currents of the thyristor.

12 Claims, 16 Drawing Sheets

Related U.S. Application Data continuation of application No. 15/385,108, filed on Dec. 20, 2016, now Pat. No. 10,674,583, which is a continuation of application No. 14/939,457, filed on Nov. 12, 2015, now Pat. No. 9,578,700, which is a continuation of application No. 12/950,079, filed on Nov. 19, 2010, now Pat. No. 9,220,133.

(60) Provisional application No. 61/263,204, filed on Nov. 20, 2009.

(51) Int. Cl.
- *H02M 5/257* (2006.01)
- *H05B 45/10* (2020.01)
- *H05B 45/3725* (2020.01)
- *H05B 45/44* (2020.01)
- *H05B 47/175* (2020.01)

(52) U.S. Cl.
CPC ......... *H05B 45/10* (2020.01); *H05B 45/3725* (2020.01); *H05B 45/44* (2020.01); *H05B 47/175* (2020.01)

(56) References Cited

U.S. PATENT DOCUMENTS

| | | | |
|---|---|---|---|
| 6,813,720 B2 | 11/2004 | Leblanc | |
| 9,220,133 B2* | 12/2015 | Salvestrini | H05B 47/175 |
| 9,572,208 B2* | 2/2017 | Melanson | H05B 45/14 |
| 9,578,700 B2 | 2/2017 | Salvestrini et al. | |
| 10,674,583 B2 | 6/2020 | Salvestrini et al. | |
| 2007/0182347 A1* | 8/2007 | Shteynberg | H05B 45/3725 315/312 |
| 2008/0191837 A1 | 8/2008 | Stocker | |
| 2008/0203934 A1 | 8/2008 | Van Meurs | |
| 2008/0258647 A1 | 10/2008 | Scianna | |
| 2009/0108765 A1 | 4/2009 | Weightman et al. | |
| 2010/0013405 A1 | 1/2010 | Thompson et al. | |
| 2010/0060187 A1 | 3/2010 | Newman, Jr. et al. | |
| 2011/0080111 A1 | 4/2011 | Nuhfer et al. | |
| 2011/0121744 A1* | 5/2011 | Salvestrini | H05B 45/14 315/246 |
| 2011/0221354 A1* | 9/2011 | Braun | H05B 41/3924 315/224 |
| 2011/0241557 A1* | 10/2011 | Grotkowski | H05B 45/3575 315/246 |
| 2011/0309759 A1* | 12/2011 | Shteynberg | H05B 45/3575 315/201 |
| 2013/0038227 A1* | 2/2013 | Yan | H05B 45/10 315/186 |
| 2016/0088697 A1* | 3/2016 | Yan | H05B 45/10 315/307 |

FOREIGN PATENT DOCUMENTS

| | | |
|---|---|---|
| WO | WO2005115058 A1 | 12/2005 |
| WO | WO2008029108 A1 | 3/2008 |

OTHER PUBLICATIONS

English translation of Chinese Office Action and Search Report dated Jul. 21, 2014 in corresponding Chinese Patent Application No. 201080062015.0.

* cited by examiner

CONTROLLABLE-LOAD CIRCUIT FOR USE WITH A LOAD CONTROL DEVICE

CROSS-REFERENCE TO RELATED APPLICATION

The present application is a continuation of U.S. patent application Ser. No. 16/889,720, filed Jun. 1, 2020; which is a continuation of U.S. patent application Ser. No. 15/385,108, filed Dec. 20, 2016, now U.S. Pat. No. 10,674,583, issued Jun. 2, 2020; which is a continuation of U.S. patent application Ser. No. 14/939,457 filed Nov. 12, 2015, now U.S. Pat. No. 9,578,700, issued Feb. 21, 2017; which is a continuation of U.S. patent application Ser. No. 12/950,079, filed Nov. 19, 2010, now U.S. Pat. No. 9,220,133, issued Dec. 22, 2015; all of which claim priority to U.S. Provisional Application Ser. No. 61/263,204, filed Nov. 20, 2009, the contents of which are hereby incorporated by reference in their entirety.

BACKGROUND OF THE INVENTION

Field of the Invention

The present invention relates to a load control device for a high-efficiency light source, such as a light-emitting diode (LED) light source or a compact fluorescent lamp, and more particularly, to a controllable-load circuit for use in an LED driver for controlling the intensity of an LED light source.

Description of the Related Art

Light-emitting diode (LED) light sources are often used in place of or as replacements for conventional incandescent, fluorescent, or halogen lamps, and the like. LED light sources comprise a plurality of light-emitting diodes mounted on a single structure and provided in a suitable housing. LED light sources are typically more efficient and provide longer operational lives as compared to incandescent, fluorescent, and halogen lamps. In order to illuminate properly, an LED driver control device (i.e., an LED driver) is typically coupled between an alternating-current (AC) source and the LED light source for regulating the power supplied to the LED light source. The LED driver may regulate either the voltage provided to the LED light source to a particular value, the current supplied to the LED light source to a specific peak current value, or may regulate both the current and voltage.

LED drivers may be controlled by standard two-wire dimmer switches. A typical dimmer switch comprises a bidirectional semiconductor switch, e.g., a thyristor (such as a triac) or two field-effect transistors (FETs) in anti-series connection. The bidirectional semiconductor switch is coupled in series between the AC power source and the LED driver and is controlled to be conductive and non-conductive for portions of a half-cycle of the AC power source to thus control the amount of power delivered to the LED driver (e.g., using a phase-control dimming technique). A "smart" dimmer switch (i.e., a digital dimmer switch) comprises a microprocessor (or similar controller) for controlling the semiconductor switch and a power supply for powering the microprocessor. In order to properly charge, the power supply of a two-wire dimmer switch must conduct a charging current $I_{CHRG}$ from the AC power source through the LED driver when the bidirectional semiconductor switch of the dimmer switch is non-conductive each half-cycle to provide an appropriate amount of voltage to the microprocessor (and any other low voltage circuitry).

Generally, dimmer switches use either a forward phase-control dimming technique or a reverse phase-control dimming technique in order to control when the bidirectional semiconductor switch is rendered conductive and non-conductive to thus control the power delivered to the LED driver. With forward phase-control dimming, the bidirectional semiconductor switch is turned on at some point within each AC line voltage half-cycle and remains on until the end of the half cycle. Forward phase-control dimming is often used to control the power delivered to a resistive or inductive load, which may include, for example, a magnetic low-voltage transformer or an incandescent lamp. Since a triac becomes non-conductive when the magnitude of the current conducted through the triac decreases to approximately zero amps, triacs are typically used for forward phase-control dimming. With reverse phase-control dimming, the bidirectional semiconductor switch is turned on at the zero-crossing of the AC line voltage and turned off at some point within each half-cycle of the AC line voltage. Reverse phase-control dimming is often used to control the power delivered to a capacitive load, which may include, for example, an electronic low-voltage transformer. Since the bidirectional semiconductor switch must be rendered conductive at the beginning of the half-cycle, and must be able to be turned off within the half-cycle, reverse phase-control dimming typically requires that the dimmer switch have two FETs in anti-serial connection, or the like.

As previously mentioned, the bidirectional semiconductor switch of the dimmer switch may be implemented as a thyristor, such as a triac or two silicon-controlled rectifiers (SCRs) coupled in anti-parallel connection. Thyristors are typically characterized by a rated latching current and a rated holding current. The current conducted through the main terminals of the thyristor must exceed the latching current for the thyristor to become fully conductive. In addition, the current conducted through the main terminals of the thyristor must remain above the holding current for the thyristor to remain in full conduction. However, when a dimmer switch is controlling a high-efficiency electrical load, such as an LED light source, the current conducted through the main terminals of the thyristor may likely not exceed the rated latching current or the rated holding current.

Some prior art lighting control systems for LED light engines have included additional load circuits coupled in parallel with the LED light engines for conducting enough current to ensure that the latching current and holding current of the thyristor in the dimmer switch are exceeded. In addition, the load circuit may also conduct the charging current of the power supply of the dimmer switch to ensure that the power supply is able to stay charged. The load circuit may comprise, for example, a fixed load, such as a resistor, or a variable load circuit that can provide two different load characteristics during each half-cycle. An example of a prior art variable load circuit is described in greater detail in co-pending, commonly-assigned U.S. patent application Ser. No. 12/438,587, filed Feb. 24, 2009, entitled VARIABLE LOAD CIRCUITS FOR USE WITH LIGHTING CONTROL DEVICES, the entire disclosure of which is hereby incorporated by reference. The prior art load circuits conduct current through the connected dimmer switches at all times when the load circuits are installed. However, it may not be necessary for the load circuits to conduct the current through the dimmer switch at all times. In other words, the prior art load circuits may unnecessarily waste power by conducting current through the dimmer switch when not required. Therefore, there is a need for a controllable-load circuit that is able to conduct the appropriate amount of current through the connected dimmer switch only when needed.

SUMMARY OF THE INVENTION

According to a first embodiment of the present invention, a load control device for controlling the amount of power delivered from an AC power source to an electrical load comprises a load control circuit, a controller, and a controllable-load circuit operable to conduct a controllable-load current having a constant magnitude that may be adjusted by the controller. The load control device is adapted to be coupled to the AC power source through a dimmer switch, such that the controllable-load current is conducted from the AC power source through the dimmer switch. The load control circuit is adapted to be coupled to the electrical load for controlling the amount of power delivered to the electrical load. The controller is coupled to the load control circuit for controlling the amount of power delivered to the electrical load in response to a conduction time of a phase-control voltage received from the dimmer switch. The controller is operable to monitor the conduction time of the phase-control voltage and to cause the controllable-load circuit to decrease the constant magnitude of the controllable-load current from an initial magnitude to a decreased magnitude, such that the conduction time of the phase-control voltage when the controllable-load current has the decreased magnitude is the same as when the controllable-load current has the initial magnitude.

According to a second embodiment of the present invention, a load control system for controlling the amount of power delivered from an AC power source to an electrical load comprises a load control device and a dimmer switch. The load control device is adapted to be coupled to the electrical load for controlling the amount of power delivered to the electrical load. The dimmer switch comprises a thyristor coupled in series electrical connection between the AC power source and the load control device, and the thyristor is characterized by a rated holding current and is operable to conduct a load current from the AC power source to the load control device. The dimmer switch is operable to generate a phase-control voltage that is provided to the load control device, such that the load control device is operable to adjust the amount of power being delivered to the electrical load in response to a conduction time of the phase-control voltage. The load control device is operable to conduct a controllable-load current from the AC power source through the thyristor of the dimmer switch, the controllable-load current having a constant magnitude for at least a portion of each half-cycle of the AC power source. The load control device is operable to decrease the constant magnitude of the controllable-load current from an initial magnitude to a decreased magnitude, such that the decreased magnitude of the load current conducted through the thyristor exceeds the rated holding current.

According to a third embodiment of the present invention, a load control system for controlling the amount of power delivered from an AC power source to first and second electrical loads, comprises a first load control device, a second load control device, and a dimmer switch. The first load control device is adapted to be coupled to the first electrical load for controlling the amount of power delivered to the first electrical load, and the second load control device is adapted to be coupled to the second electrical load for controlling the amount of power delivered to the second electrical load. The dimmer switch comprises a thyristor coupled in series electrical connection between the AC power source and the first and second load control devices, and the thyristor characterized by a rated holding current and operable to conduct a load current from the AC power source to the first and second load control devices. The dimmer switch is operable to generate a phase-control voltage that is provided to the first and second load control device, such that the first and second load control devices are operable to adjust the amount of power being delivered to the respective electrical loads in response to a conduction time of the phase-control voltage. The load control devices are operable to conduct respective controllable-load currents from the AC power source through the thyristor of the dimmer switch, and each controllable-load current has a constant magnitude for at least a portion of each half-cycle of the AC power source. The load control devices are each operable to adjust the constant magnitude of the respective controllable-load current from an initial magnitude to a decreased magnitude, such that a total magnitude of the respective controllable-load currents exceeds the rated holding current when the controllable-load currents have the respective decreased magnitudes.

According to a fourth embodiment of the present invention, a load control device controls the amount of power delivered from an AC power source to an electrical load and is adapted to be coupled to the AC power source through a dimmer switch. The load control device comprises a load control circuit adapted to be coupled to the electrical load for controlling the amount of power delivered to the electrical load, and a controller coupled to the load control circuit for controlling the amount of power delivered to the electrical load in response to a phase-control voltage received from the dimmer switch. The controller is operable to determine whether the phase-control voltage comprises a forward phase-control waveform or a reverse phase-control waveform such that the controller is operable to operate in a first mode when the phase-control voltage is a forward phase-control waveform, and to operate in a second mode when the phase-control voltage is a reverse phase-control waveform.

According to a fifth embodiment of the present invention, a load control device for controlling the amount of power delivered from an AC power source to an electrical load comprises a load control circuit, a controller, and a controllable-load circuit operable to conduct a controllable-load current from the AC power source through a dimmer switch, which is adapted to be coupled between the AC power source and the load control device. The load control circuit is adapted to be coupled to the electrical load for controlling the amount of power delivered to the electrical load. The controller is coupled to the load control circuit for controlling the amount of power delivered to the electrical load in response to a phase-control voltage received from the dimmer switch. The controller is operable to determine whether the phase-control voltage comprises a forward phase-control waveform or a reverse phase-control waveform. The controller is coupled to the controllable-load circuit to enable the controllable-load circuit, such that the controllable-load circuit conducts the controllable-load current through the dimmer switch when the phase-control voltage is a forward phase-control waveform. The controller is further operable to disable the controllable-load circuit, such that the controllable-load circuit does not conduct the controllable-load current through the dimmer switch when the phase-control voltage is a reverse phase-control waveform.

In addition, a controllable-load circuit for drawing a selected current from a power source is described herein. The controllable-load circuit comprises: (1) a first semiconductor switch having a control input coupled to the power source; (2) a first impedance-forming circuit connected in series with the first semiconductor switch across the power source; (3) a control circuit having an output coupled to a first input of the first impedance-forming circuit for selecting between at least two impedances to be connected in series with the first semiconductor switch; and (4) a second circuit coupled to the first semiconductor switch for monitoring the power source and for increasing the impedance to current flowing from the power source through the first semiconductor switch at a selected voltage level of the power source, thereby to reduce the current through the first semiconductor switch. The control circuit controls the impedance of the impedance forming circuit to automatically control the current through the first semiconductor switch so that it is at a predefined level.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1A:
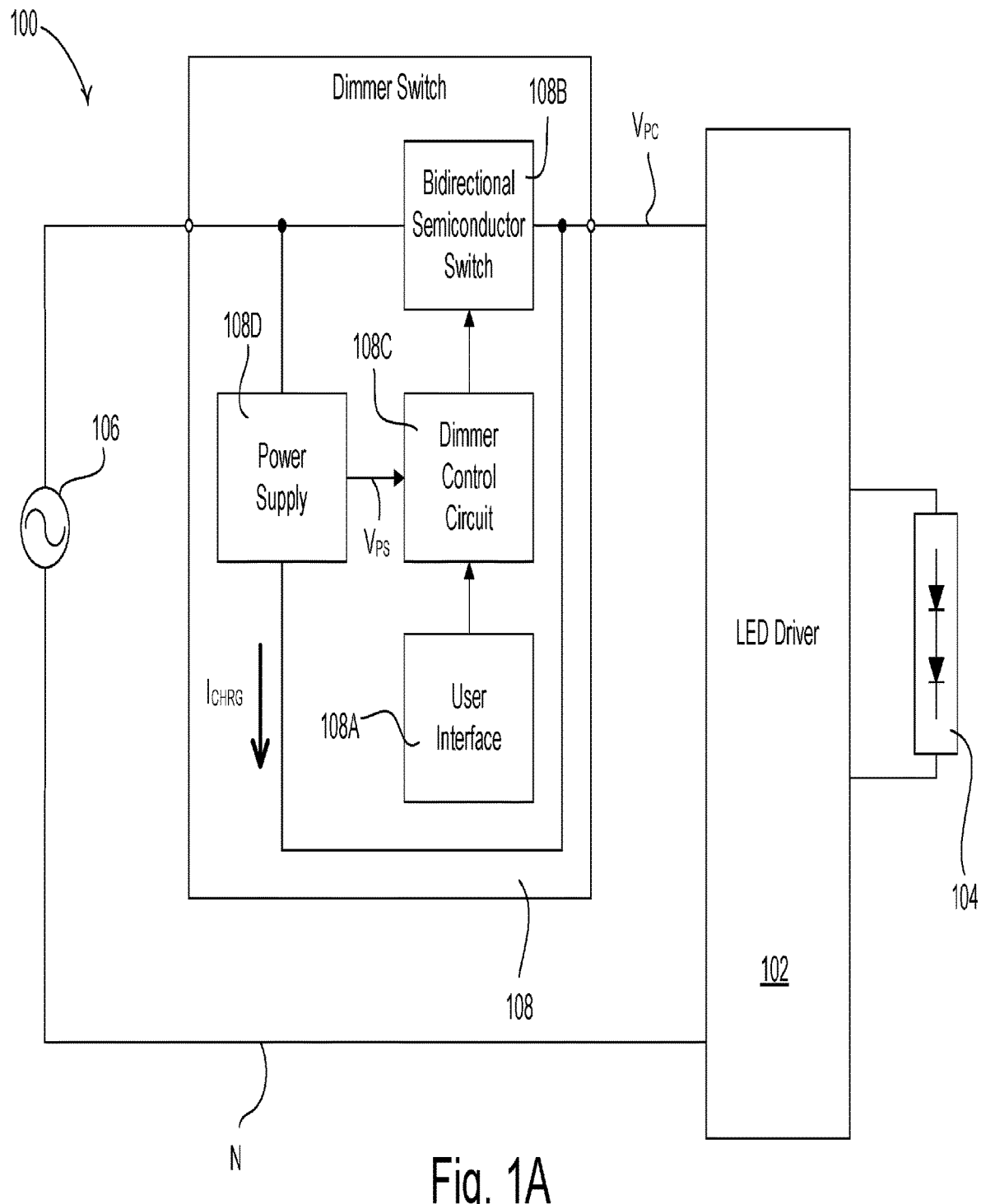
FIG. 1A is a simplified block diagram of a load control system including a digital dimmer switch and an LED driver for controlling the intensity of an LED light source according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 2A:
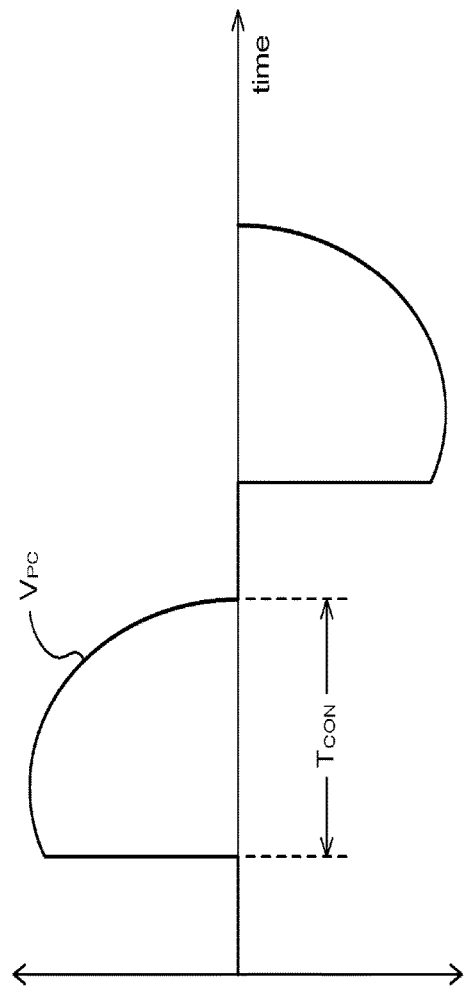
FIG. 2A is an example waveform of a forward phase-control waveform.
Figure 2B:
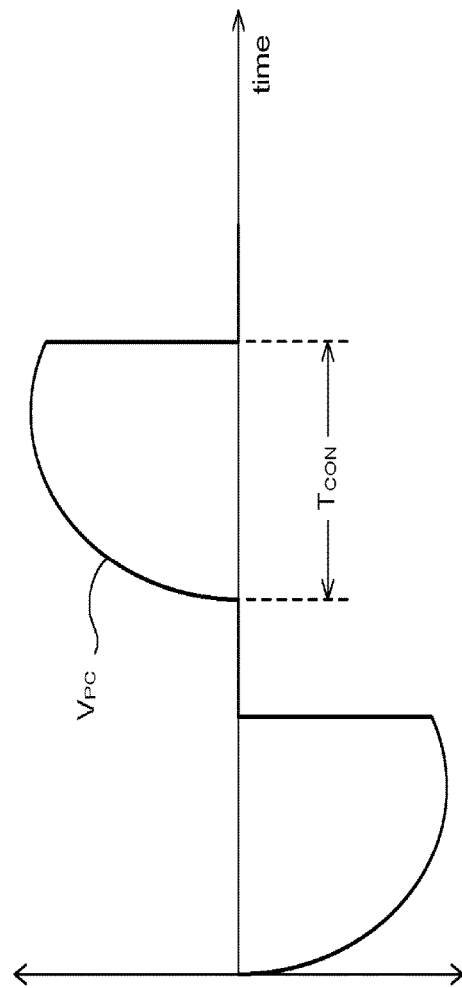
FIG. 2B is an example waveform of a reverse phase-control waveform.

FIG. 1A is a simplified block diagram of a load control system 100 including a light-emitting diode (LED) driver 102 for controlling the intensity of an LED light source 104 (e.g., an LED light engine) according to a first embodiment of the present invention. The LED driver 102 is coupled to an alternating-current (AC) power source 106 via a dimmer switch 108 (e.g., a two-wire "digital" or "smart" dimmer switch as shown in FIG. 1A). The dimmer switch 108 as shown in FIG. 1A does not require a connection to the neutral side N of the AC power source 106. Alternatively, the dimmer switch 108 may comprise a three-wire dimmer switch which would require a connection to the neutral side N of the AC power source. The dimmer switch 108 generates a phase-control voltage $V_{PC}$ (e.g., a dimmed-hot voltage), which may comprise a forward phase-control waveform, i.e., a leading-edge phase-control voltage (as shown in FIG. 2A), or a reverse phase-control waveform, i.e., a trailing-edge phase-control voltage (as shown in FIG. 2B). The LED driver 102 is coupled to the dimmer switch 108 (for receipt of the phase-control voltage $V_{PC}$) and to the neutral side N of the AC power source 106. The LED driver 102 is operable to control the intensity of the LED light source 104 in response to the phase-control voltage $V_{PC}$. The dimmer switch 108 comprises a user interface 108A including an intensity adjustment actuator (not shown), such as a slider control or a rocker switch, for allowing a user to adjust the intensity of the LED light source 104.

The dimmer switch 108 comprises a bidirectional semiconductor switch 108B, such as, for example, a thyristor (such as a triac) or two field-effect transistors (FETs) coupled in anti-series connection, for generating the phase-controlled voltage $V_{PC}$. Using a standard phase-control dimming technique, a dimmer switch control circuit 108C renders the bidirectional semiconductor switch 108B conductive at a specific time each half-cycle of the AC power source, such that the bidirectional semiconductor switch remains conductive for a conduction period $T_{CON}$ during each half-cycle of the AC power source 106. The LED driver 102 controls the amount of power delivered to the LED light source 104 in response to the phase-controlled voltage $V_{PC}$ provided by the dimmer switch 108. The LED driver 102 is operable to turn the LED light source 104 on and off in response to the conductive period $T_{CON}$ of the phase-control voltage $V_{PC}$ received from the dimmer switch 108. In addition, the LED driver 102 is operable to adjust the intensity of the LED light source 104 to a target intensity $L_{TRGT}$, which ranges between a low-end intensity $L_{LE}$ (e.g., approximately 1%) and a high-end intensity $L_{HE}$ (e.g., approximately 100%) in response to the phase-control voltage $V_{PC}$. Specifically, the LED driver 102 controls at least one of a load voltage $V_{LOAD}$ across the LED light source 104 or a load current $I_{LOAD}$ through the LED light source to control the amount of power delivered to the LED light source.

The dimmer switch 108 also often comprises a power supply 108D coupled across the bidirectional semiconductor switch 108B for powering the control circuit 108C. The power supply 108D generates a DC supply voltage $V_{PC}$ by drawing a charging current $I_{CHRG}$ from the AC power source 106 through the LED driver 102 when the bidirectional semiconductor switch 108B is non-conductive each half-cycle. Examples of digital dimmer switches having power supplies are described in greater detail in U.S. Pat. No. 5,248,919, issued Sep. 29, 1993, entitled LIGHTING CONTROL DEVICE, and in U.S. Pat. No. 6,969,959, issued Nov. 29, 2005, entitled ELECTRONIC CONTROL SYSTEMS AND METHODS, the entire disclosures of which are hereby incorporated by reference.

Figure 1B:
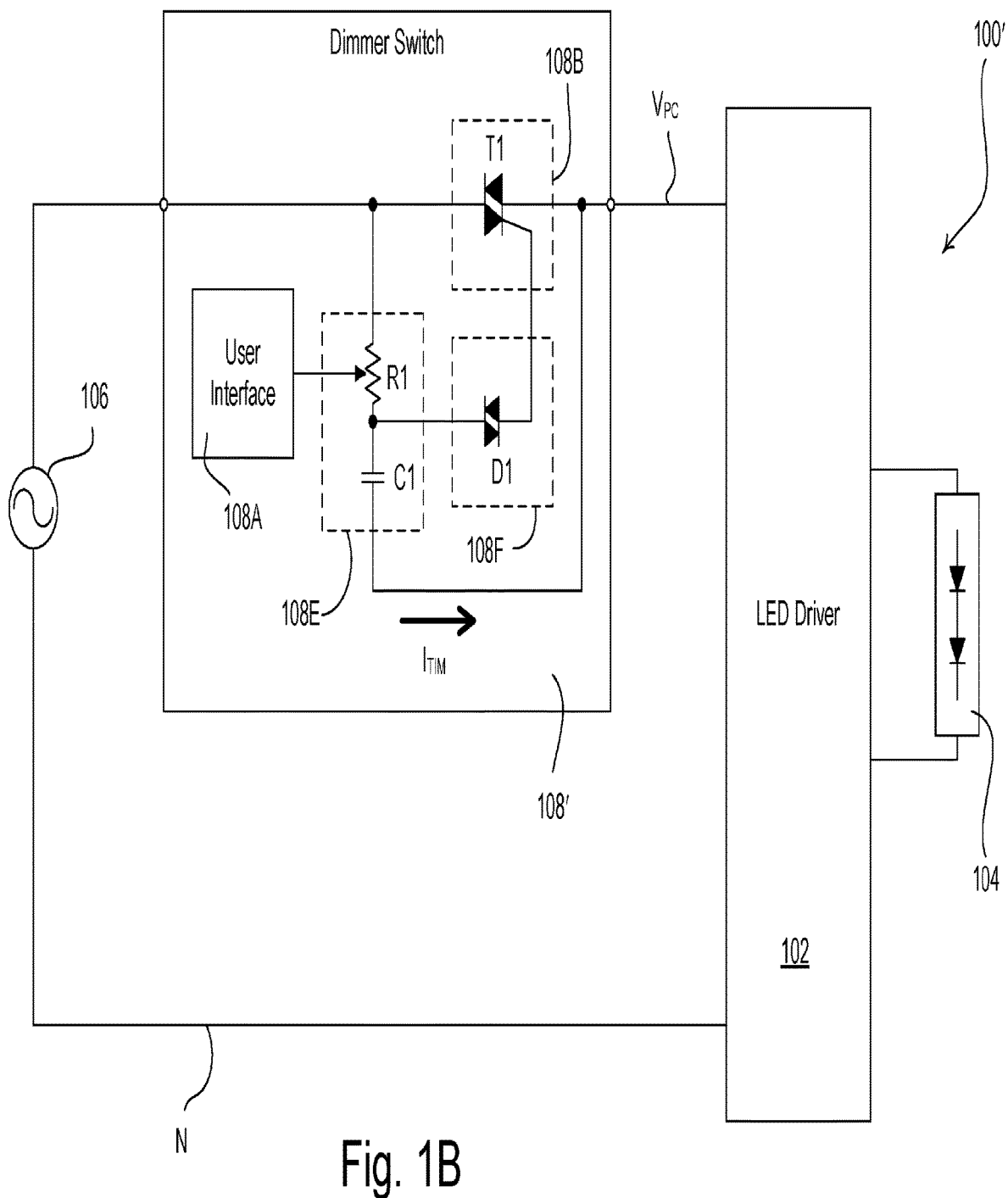
FIG. 1B is a simplified block diagram of an alternative load control system including an analog dimmer switch and an LED driver for controlling the intensity of an LED light source according to the first embodiment of the present invention.

FIG. 1B is a simplified block diagram of an alternative load control system 100' comprising a two-wire "analog" dimmer switch 108' for controlling the intensity of the LED light source 104 through the LED driver 102. The analog dimmer switch 108' includes a timing circuit 108E and a trigger circuit 108F rather than the dimmer control circuit 108C and the power supply 108D of the digital dimmer switch 108 of FIG. 1A. As shown in FIG. 1B, the bidirectional semiconductor switch 108B of the analog dimmer switch 108' is implemented as a triac T1. The timing circuit 108E is coupled in parallel electrical connection with the triac T1 and comprises, for example, a resistor R1 and a capacitor C1. The trigger circuit 108F is coupled between a gate of the triac T1 and the junction of the resistor R1 and the capacitor C1, and comprises, for example, a diac D1. The capacitor C1 of the timing circuit 108E charges by conducting a timing current $I_{TIM}$ from the AC power source 106 and through the resistor R1 and the LED driver 102 when the triac T1 is non-conductive each half-cycle. When the voltage across the capacitor C1 exceeds approximately a break-over voltage of the diac D1, the diac conducts current through the gate of the triac T1, thus, rendering the triac conductive for the conduction period $T_{CON}$. After the triac T1 is fully conductive, the timing current $I_{TIM}$ ceases to flow. As shown in FIG. 1B, the resistor R1 is a potentiometer having a resistance adjustable in response to the user interface 108A to control how quickly the capacitor C1 charges and thus the conduction period $T_{CON}$ of the phase-controlled voltage $V_{PC}$.

Figure 3:
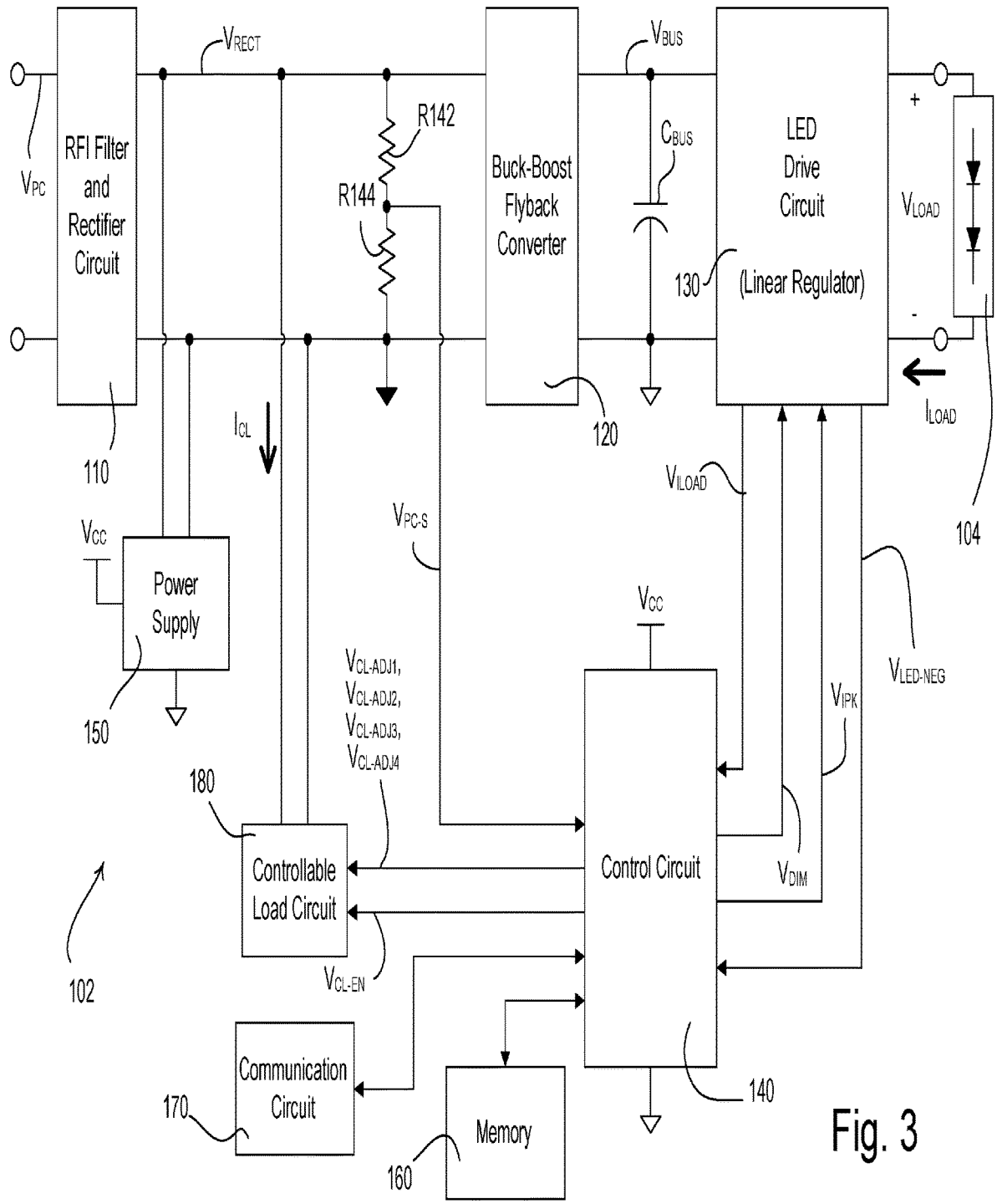
FIG. 3 is a simplified block diagram of the LED driver of FIGS. 1A and 1B.

FIG. 3 is a simplified block diagram of the LED driver 102 according to the first embodiment of the present invention. The LED driver 102 comprises a radio-frequency interference (RFI) filter and rectifier circuit 110, which receives the phase-control voltage $V_{PC}$ from the dimmer switch 108. The RFI filter and rectifier circuit 110 operates to minimize the noise provided on the AC power source 106 and to generate a rectified voltage $V_{RECT}$. A buck-boost flyback converter 120 receives the rectified voltage $V_{RECT}$ and generates a direct-current (DC) bus voltage $V_{BUS}$ across a bus capacitor $C_{BUS}$. The flyback converter 120 may alternatively comprise any suitable power converter circuit for generating an appropriate bus voltage. The flyback converter 120 may also provide electrical isolation between the AC power source 106 and the LED light source 104, and operate as a power factor correction (PFC) circuit to adjust the power factor of the LED driver 102 towards a power factor of one. The LED driver 102 comprises an LED drive circuit 130 comprising a switching power supply such as a convertor or alternatively, a linear regulator, which receives the bus voltage $V_{BUS}$ and controls the amount of power delivered to the LED light source 104 so as to control the intensity of the LED light source. An example of an LED drive circuit is described in greater detail in U.S. patent application Ser. No. 12/813,908, filed Jun. 11, 2010, entitled LOAD CONTROL DEVICE FOR A LIGHT-EMITTING DIODE LIGHT SOURCE, the entire disclosure of which is hereby incorporated by reference.

The LED driver 102 further comprises a control circuit 140 for controlling the operation of the LED drive circuit 130. The control circuit 140 may comprise, for example, a microcontroller or any other suitable processing device or controller, such as, for example, a programmable logic device (PLD), a microprocessor, or an application specific integrated circuit (ASIC). A resistive divider comprising two resistors R142, R144 is coupled across the output of the RFI filter and rectifier circuit 110 and generates a scaled phase-control voltage control signal $V_{PC-S}$, which is provided to the control circuit 140. The scaled phase-control voltage control signal $V_{PC-S}$ is representative of the magnitude of the phase-control voltage $V_{PC}$ received from the dimmer switch 108. The control circuit 140 is operable to determine the conduction period $T_{CON}$ of the phase-control voltage $V_{PC}$ (and thus the target intensity $L_{TRGT}$ of the LED light source 104) from the scaled phase-control voltage control signal $V_{PC-S}$.

The LED drive circuit 130 controls a peak magnitude $I_{PK}$ of a load current $I_{LOAD}$ conducted through the LED light source 104 in response to a peak current control signal $V_{IPK}$. The control circuit 140 receives a load current feedback signal $V_{ILOAD}$, which is representative of the magnitude of the load current $I_{LOAD}$ flowing through the LED light source 104. The control circuit 140 also receives a LED voltage feedback signal $V_{LED-NEG}$, which is representative of the magnitude of the voltage at the negative terminal of the LED light source 104.

The control circuit 140 is operable to control the LED drive circuit 130, such that the LED driver 102 is adapted to work with a plurality of different LED light sources, which may be rated to operate using different load control techniques, different dimming techniques, and different magnitudes of load current and voltage. Specifically, the control circuit 140 is operable to control the LED drive circuit 130 to control the amount of power delivered to the LED light source 104 using the two different modes of operation: a current load control mode (i.e., for using a current load control technique) and a voltage load control mode (i.e., for using a voltage load control technique). In addition, the control circuit 140 may also adjust the magnitude to which the LED drive circuit 130 will control the load current $I_{LOAD}$ through the LED light source 104 in the current load control mode, or the magnitude to which the LED driver 102 will control the load voltage $V_{LOAD}$ across the LED light source 104 in the voltage load control mode. When operating in the current load control mode, the control circuit 140 is operable to control the intensity of the LED light source 104 using two different dimming techniques: a pulse-width modulation (PWM) dimming technique and a constant current reduction (CCR) dimming technique. When operating in the voltage load control mode, the control circuit 140 is only operable to adjust the amount of power delivered to the LED light source 104 using the PWM dimming technique.

The LED driver 102 also comprises a power supply 150, which receives the rectified voltage $V_{RECT}$ and generates a direct-current (DC) supply voltage $V_{CC}$ for powering the control circuit 140 and other low-voltage circuitry of the LED driver. The control circuit 140 is also coupled to a memory 160 for storing the operational characteristics of the LED driver 102 (e.g., the load control mode, the dimming mode, and the magnitude of the rated load voltage or current). The LED driver 102 may also comprise a communication circuit 170, which may be coupled to, for example, a wired communication link or a wireless communication link, such as a radio-frequency (RF) communication link or an infrared (IR) communication link. The control circuit 140 may be operable to update the target intensity $L_{TRGT}$ of the LED light source 104 or the operational characteristics stored in the memory 160 in response to digital messages received via the communication circuit 170.

The LED driver 102 further comprises a controllable-load circuit 180 coupled to the output of the RFI filter and rectifier circuit 110 for receipt of the rectified voltage $V_{RECT}$. The controllable-load circuit 180 is operable to draw a controllable-load current $I_{CL}$ through the dimmer switch 108 to ensure that the current conducted through the thyristor of the dimmer switch exceeds the rated latching and holding currents of the thyristor. The control circuit 140 provides a controllable-load enable control signal $V_{CL-EN}$ to the controllable-load circuit 180 for enabling and disabling the conduction of the controllable-load current $I_{CL}$ through the dimmer switch 108. Specifically, the control circuit 140 is operable to enable the controllable-load circuit 180 to conduct the controllable-load current $I_{CL}$ when the phase-control voltage $V_{PC}$ is a forward phase-control waveform, and to disable the controllable-load circuit 180 when the phase-control voltage $V_{PC}$ is a reverse phase-control waveform. In addition, the control circuit 140 provides a plurality of controllable-load adjustment control signals $V_{CL-ADJ1}$, $V_{CL-ADJ2}$, $V_{CL-ADJ3}$, $V_{CL-ADJ4}$ for adjusting the magnitude of the controllable-load current $I_{CL}$ as will be described in greater detail below. In addition, the controllable-load circuit 180 may be operable to conduct the charging current $I_{CHRG}$ of the power supply 108D of the dimmer switch 108 each half-cycle (i.e., the controllable-load circuit may provide a path for the charging current of the power supply to flow).

Figure 4:
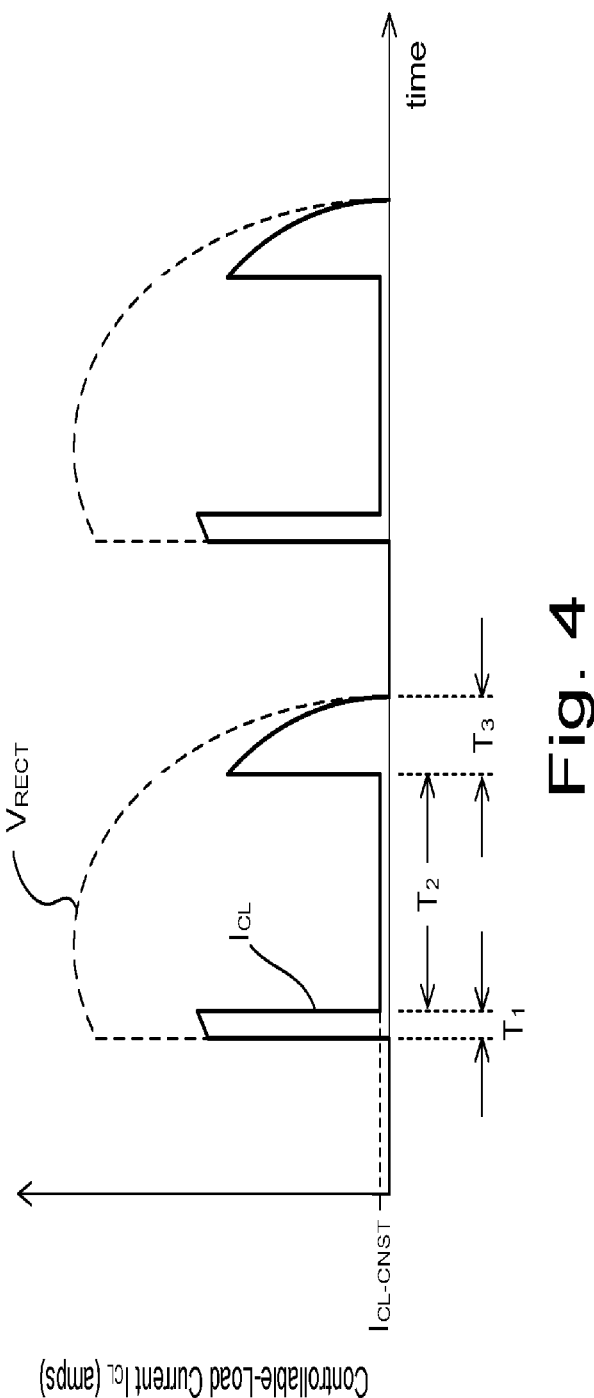
FIG. 4 is a simplified diagram of the controllable-load current drawn by the controllable-load circuit of the LED driver of FIG. 3 when the received phase-control voltage is a forward phase-control waveform.

FIG. 4 is a simplified diagram of the controllable-load current $I_{CL}$ drawn by the controllable-load circuit 180 each half-cycle of the AC power source 106 when the phase-control voltage $V_{PC}$ is a forward phase-control waveform received from the dimmer switch 108. After the thyristor of the dimmer switch 108 is rendered conductive (at the beginning of a first period $T_1$ of FIG. 4), the voltage across the LED driver 102 and thus, the rectified voltage $V_{RECT}$ quickly increase in magnitude. During the first period $T_1$ of each half-cycle, the controllable-load circuit 180 conducts a pulse of current that has a magnitude dependent upon the instantaneous magnitude of the rectified voltage $V_{RECT}$, which exceeds the rated latching current of the thyristor of the dimmer switch 108 to ensure that the thyristor latches. During a second period $T_2$ of the half-cycle, the controllable-load circuit 180 operates as a constant current sink to draw a constant current $I_{CL-CNST}$, which has a magnitude that exceeds the rating holding current of the thyristor to ensure that the thyristor remains conductive. The magnitude of the constant current $I_{CL-CNST}$ of the controllable-load current $I_{CL}$ during the second period $T_2$ is less than the controllable-load current $I_{CL}$ during the first period $T_1$ and is not needlessly large resulting in unnecessary power dissipation in the controllable-load circuit 180 each half-cycle. The control circuit 140 is operable to control the magnitude of the constant current $I_{CL-CNST}$ of the controllable-load current $I_{CL}$ during the second period $T_2$ using the controllable-load adjustment control signals $V_{CL-ADJ1}$-$V_{CL-ADJ4}$. During a final, third period $T_3$ of each half-cycle, the magnitude of the controllable-load current $I_{CL}$ is not limited to the constant current $I_{CL-CNST}$ and decreases as the magnitude of the rectified voltage $V_{RECT}$ decreases.

Figure 5:
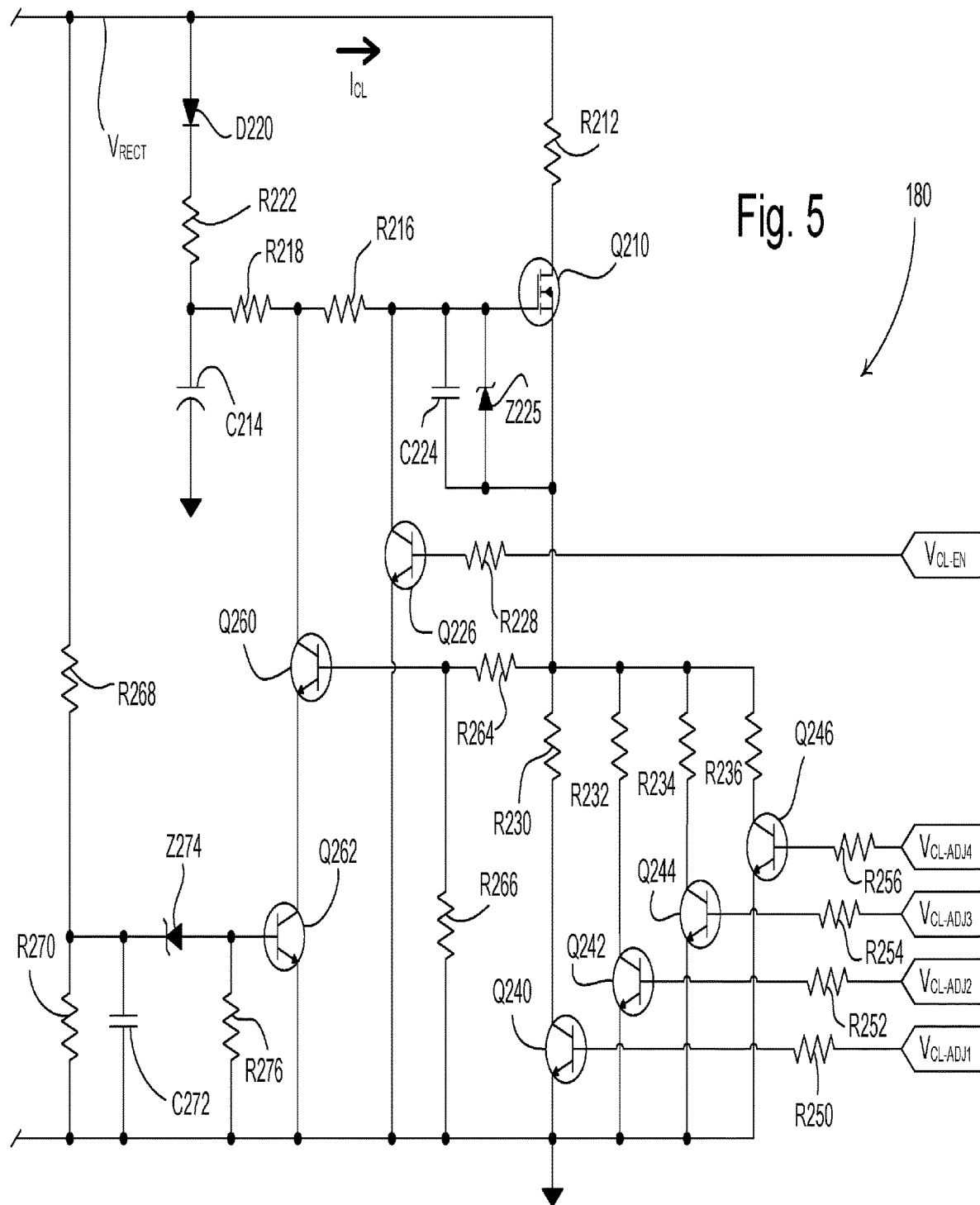
FIG. 5 is a simplified schematic diagram of the controllable-load circuit of the LED driver of FIG. 3.

FIG. 5 is a simplified schematic diagram of the controllable-load circuit 180. As previously noted, the controllable-load circuit 180 receives the rectified voltage $V_{RECT}$ from the RFI filter and rectifier circuit 110. The controllable-load circuit 180 comprises a semiconductor switch, e.g., a field-effect transistor (FET) Q210, for conducting the controllable-load current $I_{CL}$ when the FET Q210 is conductive. The drain of the FET Q210 is coupled to the rectified voltage $V_{RECT}$ through a resistor 8212 (e.g., having a resistance of approximately 330Ω). The gate of the FET Q210 is coupled to an energy-storage capacitor C214 (e.g., having a capacitance of approximately 0.044 μF) via two resistors R216, R218 (e.g., having resistances of approximately 22 kΩ and 100 kΩ, respectively). The FET Q210 is rendered conductive when the voltage at the gate of the FET exceeds the rated gate voltage of the FET. The capacitor C214 charges from the rectified voltage $V_{RECT}$ through a diode D220 and a resistor R222 (e.g., having a resistance of approximately 100 kΩ), and operates to maintain the appropriate gate voltage at the gate of the FET Q210 independent of the instantaneous magnitude of the rectified voltage $V_{RECT}$. A capacitor C224 (e.g., having a capacitance of approximately 0.047 μF) and a zener diode Z225 are coupled between the gate and the source of the FET Q210.

The controllable-load circuit 180 further comprises an NPN bipolar junction transistor (BJT) Q226 coupled between the gate of the FET Q210 and circuit common. The controllable-load enable control signal $V_{CL-EN}$ is coupled to the base of the transistor Q226 via a resistor R228 (e.g., having a resistance of approximately 100 kΩ). When the control circuit 140 drives the controllable-load enable control signal $V_{CL-EN}$ high (i.e., to approximately the DC supply voltage $V_{CC}$), the transistor Q226 is rendered conductive, thus pulling the gate of the FET Q210 down towards circuit common. Accordingly, the FET Q210 is rendered non-conductive and the conduction of the controllable-load current $I_{CL}$ is disabled. When the control circuit 140 drives the controllable-load enable control signal $V_{CL-EN}$ low (i.e., to approximately circuit common), the transistor Q226 is rendered non-conductive and the FET Q210 operates to conduct the controllable-load current $I_{CL}$ (i.e., the conduction of the controllable-load current $I_{CL}$ is enabled).

The source of the FET Q210 is coupled to circuit common via a plurality of resistors R230, R232, R234, R236 and respective NPN bipolar junction transistors Q240, Q242, Q244, Q246 to create an impedance-forming circuit. The bases of the transistors Q240, Q242, Q244, Q246 are coupled to respective resistors R250, R252, R254, R256, which each have a resistance, for example, of approximately 100 kΩ. The controllable-load adjustment control signals $V_{CL-ADJ1}$-$V_{CL-ADJ4}$ are coupled to the bases of the respective transistors Q240-Q246 via the respective resistors R250-R256. The control circuit 140 is operable to control the controllable-load adjustment control signals $V_{CL-ADJ1}$-$V_{CL-ADJ4}$, for example, in a digital manner in order to provide fifteen different magnitudes of the constant current $I_{CL-CNST}$ of the controllable-load current $I_{CL}$ during the second period $T_2$ of each half-cycle as will be described in greater detail below. For example, the first resistor R230 may have a resistance of approximately 25Ω, the second resistor R232 may have a resistance of approximately 50Ω, the third resistor R234 may have a resistance of approximately 100Ω, and the fourth resistor R236 may have a resistance of approximately 200Ω. The control circuit 140 controls at least one of the transistors Q240-Q246 to be conductive at all times, but may control more than one of the transistors to be conductive to couple two or more of the resistors R230-R236 in parallel. Accordingly, the impedance provided between the source of the FET Q210 and circuit common may range between approximately a minimum resistance $R_{MIN}$ (e.g., approximately 13.33Ω) when all of the transistors Q240-Q246 are conductive, and a maximum resistance $R_{MAX}$ (e.g., approximately 200Ω) when only the fourth transistor Q246 is conductive.

Two NPN bipolar junction transistors Q260, Q262 are coupled in series between the junction of the resistors R216, R218 and circuit common. The base of the first transistor Q260 is coupled to the source of the FET Q210 via a resistor R264 (e.g., having a resistance of approximately 1Ω) and to circuit common via a resistor R266 (e.g., having a resistance of approximately 1Ω). The first transistor Q260 operates to control the magnitude of the constant current $I_{CL-CNST}$ of the controllable-load current $I_{CL}$ conducted through the FET Q210 during the second period $T_2$ of each half-cycle as will be described in greater detail below.

The second transistor Q262 is controlled to be conductive and non-conductive in response to the magnitude of the rectified voltage $V_{RECT}$ to control when the first transistor Q260 limits the magnitude of the constant current $I_{CL-CNST}$ of the controllable-load current $I_{CL}$. A resistive divider comprising two resistors R268, R270 is coupled across the output of the RFI filter and rectifier circuit 110 and generates a scaled version of the rectified voltage $V_{RECT}$. A capacitor C272 is coupled in parallel with the resistor R270 and has a capacitance of, for example, approximately 47 pF. The base of the transistor Q262 is coupled to the junction of the two resistors R268, R270 through a zener diode Z274 and to circuit common through a resistor R276 (e.g., having a resistance of approximately 100Ω). For example, the resistors R268, R270 of the resistive divider may have resistances of approximately 2 MΩ and 392 kΩ, respectively, and the zener diode Z274 may have a breakover voltage of approximately 5.6 V.

When the phase-control voltage $V_{PC}$ received by the LED driver 102 is a forward phase-control waveform (as shown in FIG. 4), the controllable-load circuit 180 may not begin to conduct the controllable-load current $I_{CL}$ at the beginning of each half-cycle of the AC power source 106 since the magnitude of the rectified voltage $V_{RECT}$ may be approximately zero volts at this time and the capacitor C214 may not be charged to an appropriate voltage to render the FET Q210 conductive. When the thyristor of the dimmer switch 108 is rendered conductive (at the beginning of the first period of time $T_1$), the magnitude of the rectified voltage $V_{RECT}$ increases and the capacitor C214 charges quickly, such that the FET Q210 is driven into saturation and the controllable-load circuit 180 begins to conduct the controllable-load current $I_{CL}$. The controllable-load circuit 180 operates to conduct enough current through the thyristor of the dimmer switch 108 to exceed the rated latching current of the thyristor during the first period of time $T_1$. At the beginning of the first period $T_1$, the capacitor C272 also begins to charge through the resistor R268. The transistor Q262 is rendered conductive when the magnitude of the voltage across the capacitor C272 exceeds the rated base-emitter voltage of the transistor for the duration of the second period of time $T_2$. Accordingly, the length of the first period $T_1$ is thus determined by the amount of time required to charge the capacitor C272 to the rated base-emitter voltage of the transistor Q262. Similarly, as the magnitude of the rectified voltage $V_{RECT}$ decreases, the magnitude of the voltage across the capacitor C272 drops below the rated base-emitter voltage of the transistor Q262, thus rendering the transistor non-conductive at the beginning of the third period of time $T_3$ such that the FET Q210 is driven into saturation once again at the end of the half cycle.

When the transistor Q262 is rendered conductive, the transistor Q260 controls the magnitude of the controllable-load current $I_{CL}$ to the constant current $I_{CL-CNST}$ during the second period of time $T_2$ in order to conduct enough current through the thyristor of the dimmer switch 108 to exceed the rated holding current of the thyristor. During the second period of time $T_2$, the transistor Q260 operates in the linear region and pulls the gate voltage of the FET Q210 down towards circuit common, thus causing the FET Q210 to also operate in the linear region. The magnitude of the constant current $I_{CL-CNST}$ of the controllable-load current $I_{CL}$ is dependent upon the impedance provided between the source of the FET Q210 and circuit common. Accordingly, the control circuit 140 is operable to selectively render the transistors Q240-Q246 conductive and non-conductive to adjust the impedance provided between the source of the FET Q210 and circuit common, and thus to control the magnitude of the constant current $I_{CL-CNST}$ to one of the fifteen different discrete magnitudes.

The magnitude of the constant current $I_{CL-CNST}$ of the controllable-load current $I_{CL}$ is controlled to a maximum current $I_{CL-MAX}$ (e.g., approximately 50 mA) when the impedance provided between the source of the FET Q210 and circuit common is the minimum resistance $R_{MIN}$ (i.e., when all of the transistors Q240-Q246 are rendered conductive and all of the resistors R230-R236 are coupled in parallel). The magnitude of the constant current $I_{CL-CNST}$ is controlled to a minimum current $I_{CL-MIN}$ (e.g., approximately 3.5 mA) when the impedance provided between the source of the FET Q210 and circuit common is a maximum resistance (i.e., when only the transistor Q246 is rendered conductive and only the resistor R236 is coupled between the source of the FET Q210 and circuit common). The control circuit 140 controls at least one of the transistors Q240-Q246 to be conductive at all times, but may control more than one of the transistors to be conductive to coupled two or more of the resistors R230-R236 in parallel. The control circuit 140 is operable to turn off the conduction of the controllable-load current $I_{CL}$ by driving the controllable-load enable control signal $V_{CL-EN}$ high and rendering the transistor Q226 conductive and the FET Q210 non-conductive.

Immediately after starting up (i.e., when power is first applied to the LED driver 102) when the dimmer switch 108 is on or immediately after the dimmer switch is first turned on, the control circuit 140 is operable to determine whether the phase-control voltage $V_{PC}$ is a forward phase-control waveform or a reverse phase-control waveform. Specifically, the control circuit 140 monitors the magnitude of the phase-control voltage $V_{PC}$ using the scaled phase-control voltage control signal $V_{PC-S}$ to determine whether the phase-control voltage $V_{PC}$ is a forward phase-control waveform or a reverse phase-control waveform. If the phase-control voltage $V_{PC}$ is a forward phase-control waveform, the magnitude of the phase-control voltage will increase very quickly from approximately zero volts to a large magnitude at a specific time each half-cycle depending upon the length of the conduction period $T_{CON}$. If the phase-control voltage $V_{PC}$ is a reverse phase-control waveform, the magnitude of the phase-control voltage will increase slowly from approximately zero volts at the beginning of each half-cycle.

Therefore, after detecting a voltage transition of the phase-control voltage $V_{PC}$ (i.e., when the phase-control voltage increases from approximately zero volts to be greater than zero volts), the control circuit 140 is operable to compare the magnitude of the phase-control voltage $V_{PC}$ to a voltage threshold $V_{TH}$ (e.g., approximately 38-40 volts). If the magnitude of the phase-control voltage $V_{PC}$ is consistently larger than the voltage threshold $V_{TH}$, the control circuit 140 concludes that the phase-control voltage is a forward phase-control waveform and enables the conduction of the controllable-load current $I_{CL}$. Otherwise, the control circuit 140 concludes that the phase-control voltage is a reverse phase-control waveform and disables the conduction of the controllable-load current $I_{CL}$. Because reverse phase-control waveforms are typically generated by dimmer switches having FETs and FETs are not limited by latching or holding currents, there is no need to enable the controllable-load circuit 180 when the phase-control voltage is a reverse phase-control waveform.

Figure 6:
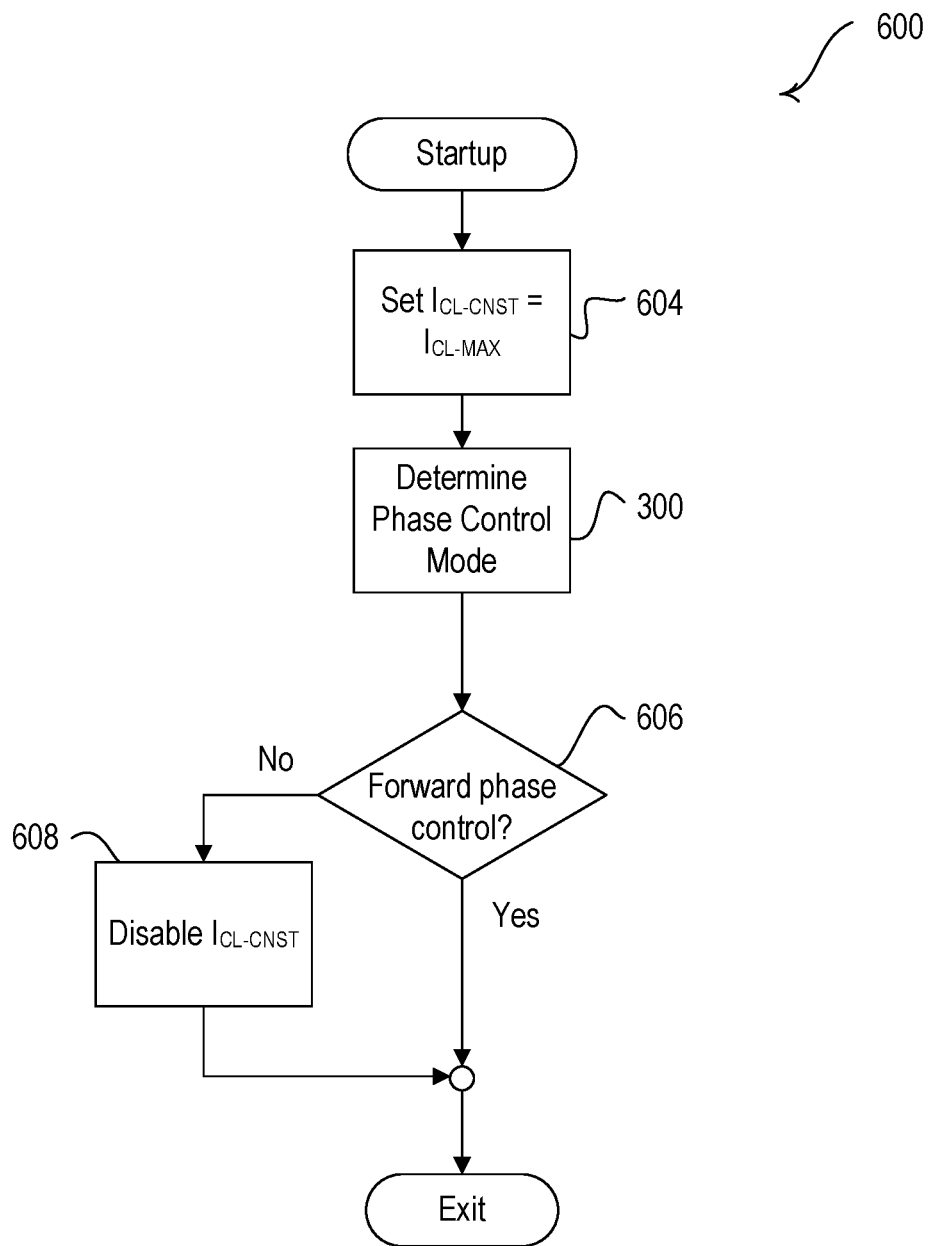
FIG. 6 is a simplified flowchart of a startup procedure executed by a control circuit of the LED driver of FIG. 3 when power is first applied to the LED driver.
Figure 7:
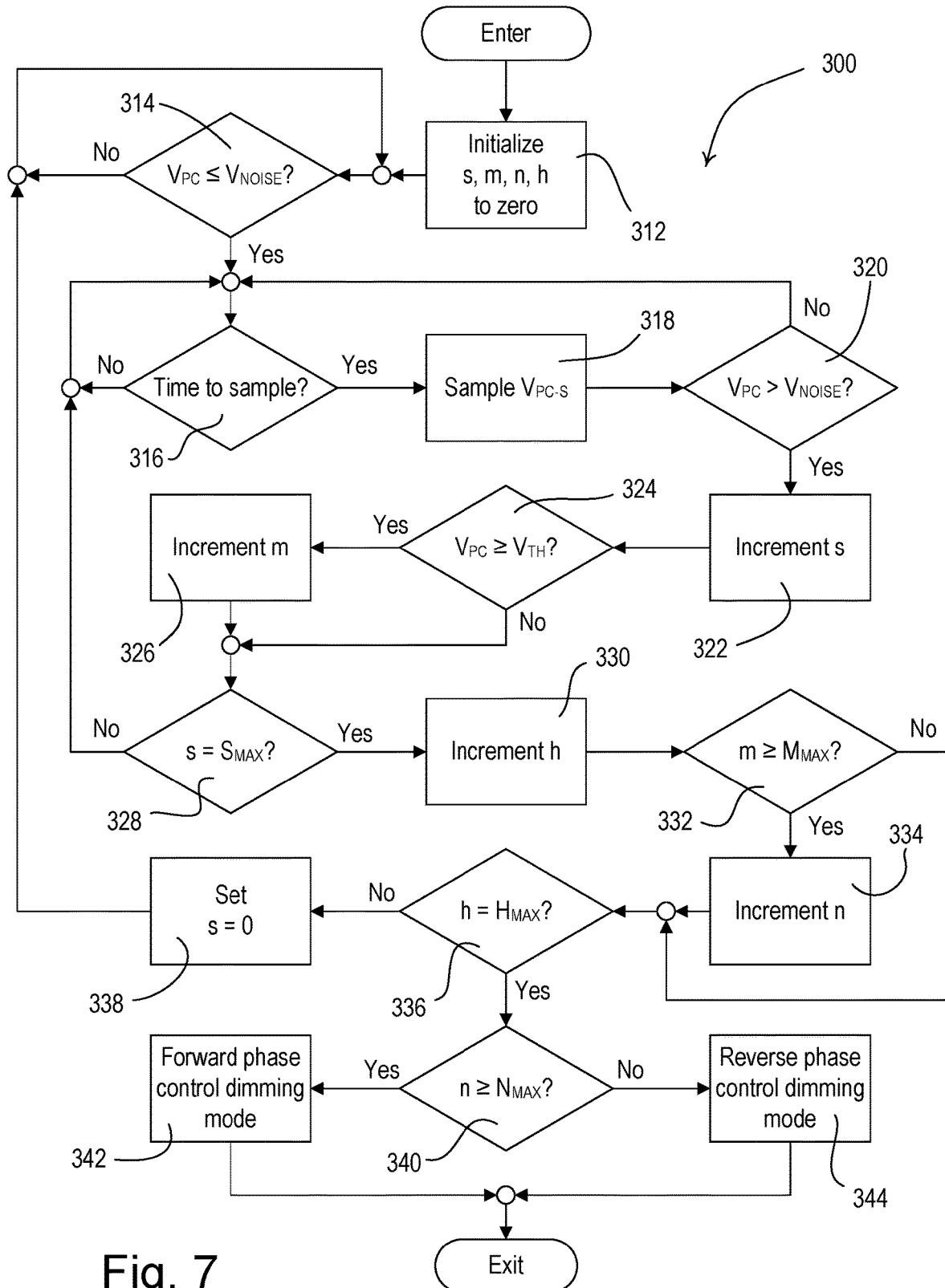
FIG. 7 is a simplified flowchart of a phase control determination procedure executed by the control circuit of the LED driver of FIG. 3.

FIG. 6 is a simplified flowchart of a startup procedure 600 executed by the control circuit 140 when power is first applied to the LED driver 102 at step 602. The control circuit 140 first enables the controllable load circuit 180 via the controllable-load enable control signal $V_{CL-EN}$ and controls the magnitude of the constant current $I_{CL-CNST}$ of the controllable-load current $I_{CL}$ to the maximum current $I_{CL-MAX}$ (in the event that the phase-control voltage $V_{PC}$ is a forward phase-control waveform.) Then, the control circuit 140 executes a phase control determination procedure 300 to determine whether the phase-control voltage $V_{PC}$ from the dimmer switch 108 is a forward phase-control waveform or a reverse phase-control waveform as shown in FIG. 7 and described further below. Next, if the phase-control voltage $V_{PC}$ is not a forward phase-control waveform (i.e., it is a reverse phase control waveform as shown in FIG. 2B) at step 606, then the control circuit 140 disables the controllable load circuit 180 via the controllable-load enable control signal $V_{CL-EN}$ before the startup procedure 600 exits. If the phase-control voltage $V_{PC}$ is a forward phase-control waveform as shown in FIG. 2A, then the controllable load circuit 180 remains enabled before the startup procedure 600 exits.

FIG. 7 is a simplified flowchart of the phase control determination procedure 300 executed by the control circuit 140 of the LED driver 102. The control circuit 140 first initializes a number of counters s, m, n, h to zero at step 312, and then waits for the next voltage transition at step 314. Specifically, the control circuit 140 waits while the magnitude of the phase-control voltage $V_{PC}$ (as determined from the scaled phase-control voltage control signal $V_{PC-S}$) is greater than a noise threshold $V_{NOISE}$ (e.g., approximately 10 V) at step 314. When the magnitude of the phase-control voltage $V_{PC}$ becomes less than or equal to the noise threshold $V_{NOISE}$ at step 314, the control circuit 140 waits for the next sampling time at step 316 to sample the scaled phase-control voltage control signal $V_{PC-S}$. For example, the control circuit 140 may sample the scaled phase-control voltage control signal $V_{PC-S}$ using a sampling period $T_{SAMPLE}$ of approximately 35 μsec. At the next sampling time at step 316, the control circuit 140 samples the scaled phase-control voltage control signal $V_{PC-S}$ at step 318. The control circuit 140 continues to sample the scaled phase-control voltage control signal $V_{PC-S}$ at step 318 until the magnitude of the phase-control voltage $V_{PC}$ becomes greater than the noise threshold $V_{NOISE}$ at step 320.

When the magnitude of the phase-control voltage $V_{PC}$ rises above the noise threshold $V_{NOISE}$ at step 320, the control circuit 140 samples the scaled phase-control voltage control signal $V_{PC-S}$ a predetermined maximum number $S_{MAX}$ of times (e.g., 10 samples) each half cycle over a predetermined number $H_{MAX}$ of consecutive half-cycles (e.g., 10 half-cycles). If at least a first predetermined number $M_{MAX}$ (e.g., approximately 7) of the samples are above the second voltage threshold $V_{TH2}$ (i.e., approximately 38 V) for at least a second predetermined number $N_{MAX}$ (e.g., approximately 7) of the half-cycles, the control circuit 140 concludes that the phase-control voltage $V_{PC}$ generated by the dimmer switch 108 is a forward phase-control waveform and enables the controllable-load circuit 180. Otherwise, the control circuit 140 assumes that the phase-control voltage $V_{PC}$ is a reverse phase-control waveform and disables the controllable-load circuit 180.

Referring back to FIG. 7, the control circuit 140 increments the counter s by one at step 322 in order to keep track of the number of times that the scaled phase-control voltage control signal $V_{PC-S}$ has been sampled. If the magnitude of the phase-control voltage $V_{PC}$ is greater than or equal to the voltage threshold $V_{TH}$ at step 324, the control circuit 140 increments the counter m by one at step 326 to keep track of the number of samples greater than the voltage threshold $V_{TH}$. If the magnitude of the phase-control voltage $V_{PC}$ is less than the voltage threshold $V_{TH}$ at step 324, the control circuit 140 does not increment the counter m. If the value of the counter s is not equal to (i.e., is less than) the predetermined maximum number $S_{MAX}$ of samples (i.e., 10) at step 328, the control circuit 140 waits for the correct time to sample the scaled phase-control voltage control signal $V_{PC-S}$ at step 316 and once again samples the scaled phase-control voltage control signal $V_{PC-S}$ at step 318 and determines if the magnitude of the phase-control voltage $V_{PC}$ is greater than the voltage threshold $V_{TH}$ at step 324.

When the value of the counter s has increased to the predetermined maximum number $S_{MAX}$ of samples at step 328, the control circuit 140 increments the counter h by one at step 330 to keep track of the number of consecutive half-cycles during which the control circuit has sampled the scaled phase-control voltage control signal $V_{PC-S}$. If the value of the counter m (i.e., the number of samples exceeding the voltage threshold $V_{TH}$) is greater than or equal to the value of the predetermined number $M_{MAX}$ at step 332, the control circuit 140 increments the counter n by one at step 334. If the value of the counter h is not equal to (i.e., less than) the maximum number $H_{MAX}$ (i.e., 10) of half-cycles at step 336, the control circuit 140 resets the counter s to zero at step 338 and then waits for the beginning of the next half-cycle at step 314.

If the counter h is equal to the maximum number $H_{MAX}$ of half-cycles at step 336, the control circuit 140 determines if the value of the counter n (i.e., the number of half-cycles containing at least the first predetermined number $M_{MAX}$ of samples exceeding the voltage threshold $V_{TH}$) is greater than or equal to the second predetermined number $N_{MAX}$ at step 340. If so, the control circuit 140 determines that the phase-control voltage $V_{PC}$ is a forward phase-control waveform and thus, begins to operate in a forward phase control mode at step 342. Specifically, when operating in forward phase control mode, the control circuit 140 drives the controllable-load enable control signal $V_{CL-EN}$ low to enable the controllable-load circuit 180 at step 342, before the startup procedure 300 exits. If the value of the counter n is less than the second predetermined number $N_{MAX}$ at step 340, the control circuit 140 determines that the phase-control voltage $V_{PC}$ is a reverse phase-control waveform and thus, begins to operate in a reverse phase control mode at step 342. Specifically, when operating in reverse phase control mode, the control circuit drives the controllable-load enable control signal $V_{CL-EN}$ high to disable the controllable-load circuit 180 at step 344, before the startup procedure 300 exits.

After the control circuit 140 has determined that the phase-control voltage $V_{PC}$ is a forward phase-control waveform and has enabled the controllable-load circuit 180, the control circuit is operable to gradually reduce the magnitude of the constant current $I_{CL-CNST}$ drawn by the controllable-load circuit during the second period $T_2$ of each half-cycle until the control circuit determines the lowest current at which the dimmer switch 108 operates properly. The control circuit 140 monitors the conduction period $T_{CON}$ of the phase-control voltage $V_{PC}$ (via the scaled phase-control voltage control signal $V_{PC-S}$) to determine if changes in the constant current $I_{CL-CNST}$ of the controllable-load current $I_{CL}$ affect the operation of the dimmer switch 108. Specifically, large variations in the conduction time $T_{CON}$ may indicate that the operation of the dimmer switch 108 has been affected by the change in the constant current $I_{CL-CNST}$ drawn by the controllable-load circuit 180. If the control circuit 140 determines that the constant current $I_{CL-CNST}$ of the controllable-load current $I_{CL}$ has been decreased too low, the control circuit increases the magnitude of the constant current $I_{CL-CNST}$ back to the last suitable level and stops adjusting the magnitude of the constant current $I_{CL-CNST}$.

Figure 8:
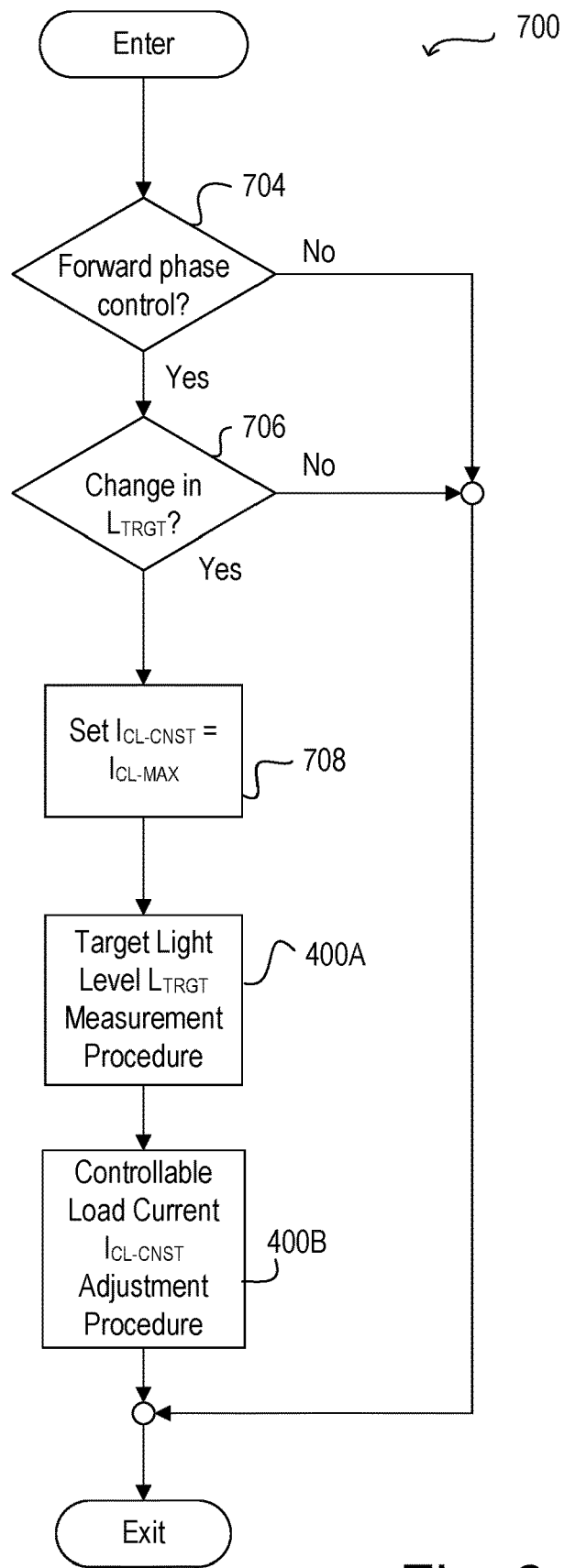
FIG. 8 is a simplified flowchart of a controllable load current procedure executed periodically by the control circuit of the LED driver of FIG. 3.

FIG. 8 is a simplified flowchart of a controllable-load current procedure 700 executed periodically (e.g., once each line cycle) by the control circuit 140 of the LED driver 102. The control circuit 140 executes the controllable-load current procedure 700 to monitor changes of the target intensity $L_{TRGT}$ (i.e., changes of the conduction period $T_{CON}$ of the phase-control voltage $V_{PC}$) and to reduce the magnitude of the constant current $I_{CL-CNST}$ of the controllable-load current $I_{CL}$ to the lowest possible magnitude. The magnitude of the constant current $I_{CL-CNST}$ of the controllable-load current $I_{CL}$ needed to ensure that the thyristor remains conductive may change as a result of a change in the conduction period $T_{CON}$ of the phase-control voltage $V_{PC}$, thus, changes of the target intensity $L_{TRGT}$ are closely monitored such that the magnitude of the constant current $I_{CL-CNST}$ of the controllable-load current $I_{CL}$, can be updated accordingly. The controllable-load current procedure 700 is also executed immediately after the startup procedure 600 exits.

Referring to FIG. 8, if the phase-control voltage $V_{PC}$ is a reverse phase-control waveform at step 704, the controllable-load current procedure 700 simply exits. However, if the phase-control voltage $V_{PC}$ is a forward phase-control waveform at step 704, the control circuit 140 determines whether there has been a change in the target intensity $L_{TRGT}$ at step 706. If there is no change, then the controllable-load current procedure 700 exits. Otherwise, the control circuit 140 controls the magnitude of the constant current $I_{CL-CNST}$ of the controllable-load current $I_{CL}$ to the maximum current $I_{CL\_MAX}$ at step 708 (to ensure that the thyristor of the dimmer switch 108 remains conductive as the target intensity $L_{TRGT}$ changes).

Figure 9:
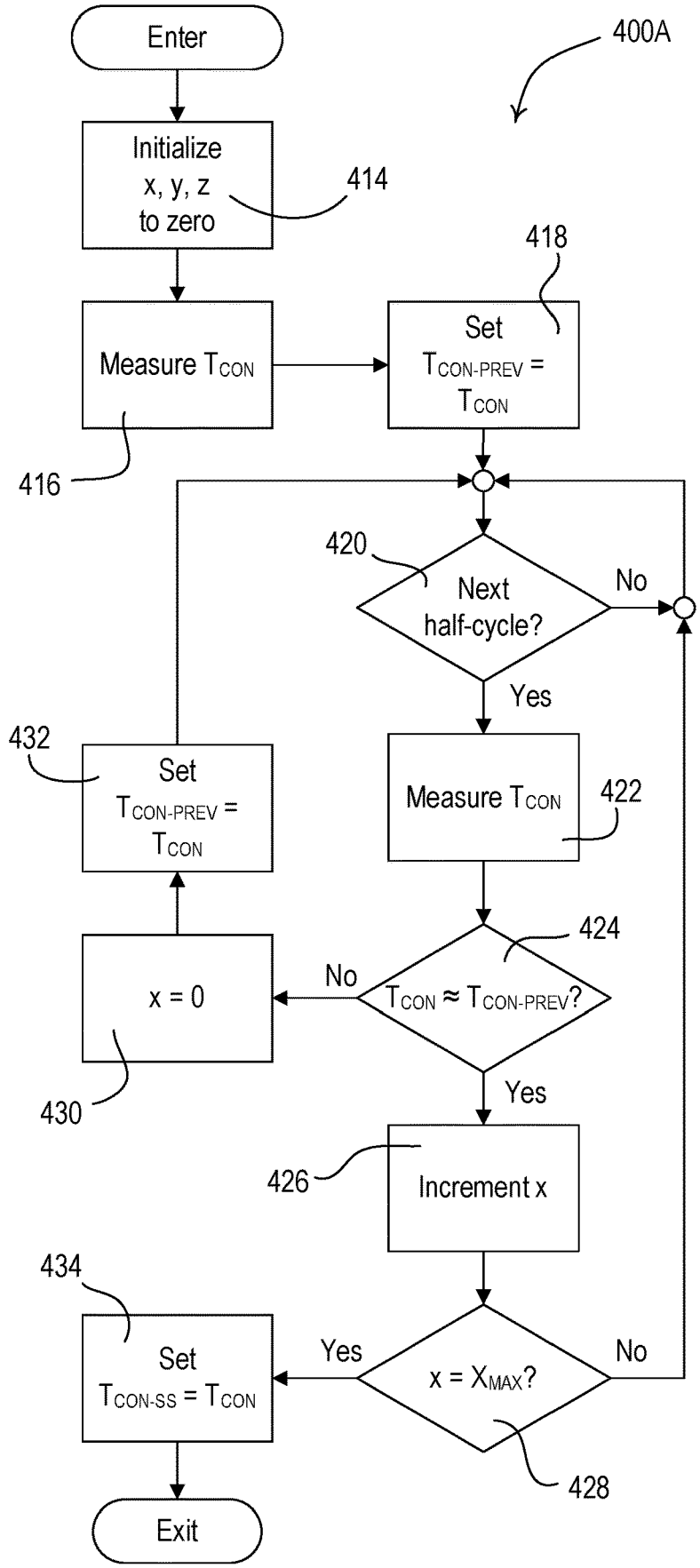
FIG. 9 is a simplified flowchart of a target light level measurement procedure executed by the control circuit of the LED driver of FIG. 3 in response to changes of a target intensity.
Figure 10:
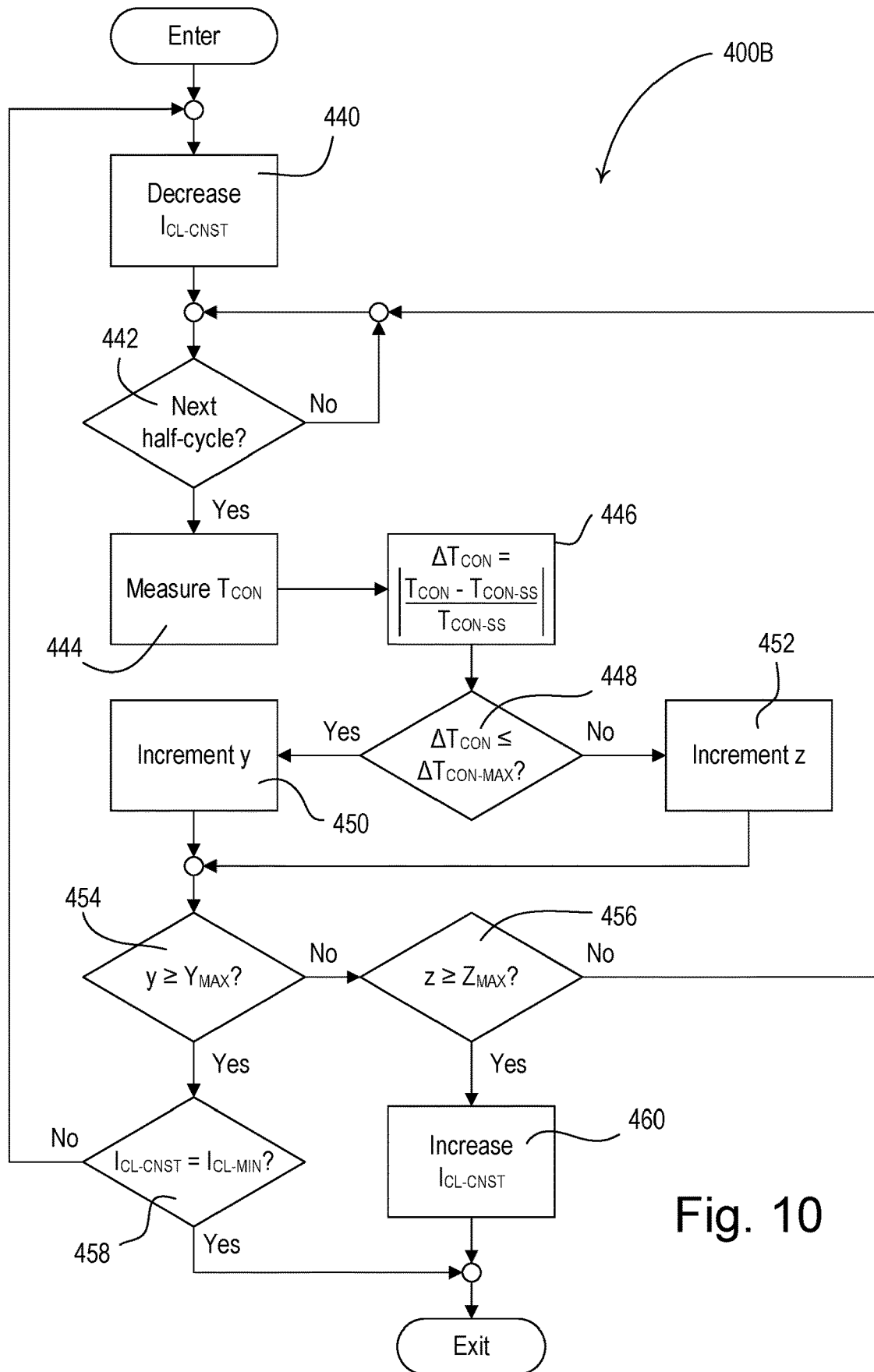
FIG. 10 is a simplified flowchart of a controllable load current adjustment procedure executed by the control circuit of the LED driver of FIG. 3 in response to changes of a target intensity.

Next, the control circuit 140 executes a target light level measurement procedure 400A as shown in FIG. 9 and described in greater detail below. Once the target light measurement procedure 400A is completed, the control circuit 140 considers the target intensity $L_{TRGT}$ to be stabilized (i.e., the phase control signal $V_{PC}$ is no longer changing in response to user adjustment at the dimmer switch 108). Then, the control circuit 140 executes a controllable-load current adjustment procedure 400B as shown in FIG. 10 and described in greater detail below. The controllable-load current adjustment procedure 400B gradually reduces the magnitude of the constant current $I_{CL-CNST}$ of the controllable-load current $I_{CL}$ to the lowest possible magnitude before the controllable-load current procedure 700 exits.

FIG. 9 is a simplified flowchart of the target light level measurement procedure 400A. The control circuit 140 first initializes counters x, y, z to zero at step 414. Next, the control circuit 140 measures the length of the conduction period $T_{CON}$ of the phase-control voltage $V_{PC}$ (via the scaled phase-control voltage control signal $V_{PC-S}$) at step 416. At step 418, the control circuit 140 sets a previous conduction period $T_{CON-PREV}$ equal to the length of the conduction period $T_{CON}$ determined at step 416.

The control circuit 140 then waits for a predetermined number $X_{MAX}$ of consecutive stable half-cycles (i.e., half-cycles having the same conduction period $T_{CON}$), before attempting to adjust the magnitude of the constant current $I_{CL-CNST}$ of the controllable-load current $I_{CL}$. After the beginning of the next half-cycle at step 420, the control circuit 140 measures the conduction period $T_{CON}$ of the new half-cycle at step 422. If the conduction period $T_{CON}$ (measured at step 422) is approximately equal to the previous conduction period $T_{CON-PREV}$ at step 424 (i.e., within a predetermined tolerance), the control circuit 140 increments the counter x at step 426 to keep track of the number of consecutive half-cycles having the same conduction period $T_{CON}$. If the value of the counter x is not equal to the predetermined number $X_{MAX}$ at step 428, the controllable-load current procedure 400 loops around to determine the conduction period $T_{CON}$ of the next half-cycle at steps 420 and 422. When the conduction period $T_{CON}$ (measured at step 422) is not equal to the previous conduction period $T_{CON-PREV}$ at step 424, the control circuit 140 sets the value of the counter x equal to zero at step 430 and sets the previous conduction period $T_{CON-PREV}$ equal to the length of the conduction period $T_{CON}$ (as determined at step 422) at step 432, before the controllable-load current procedure 400 loops around to determine the conduction period $T_{CON}$ of the next half-cycle at steps 420 and 422. When the value of the counter x has become equal to the predetermined number $X_{MAX}$ at step 428, the control circuit 140 sets at step 434 a steady-state conduction period $T_{CON-SS}$ equal to the value of the conduction period $T_{CON}$ (as last measured at step 424) before exiting the target light level measurement procedure 400A.

FIG. 10 is a simplified flowchart of the controllable-load current adjustment procedure 400B which is executed by the control circuit 140 to begin to scale back the magnitude of the constant current $I_{CL-CNST}$ of the controllable-load current $I_{CL}$. At step 440, the control circuit 140 decreases the magnitude of the constant current $I_{CL-CNST}$ of the controllable-load current $I_{CL}$ by controlling the controllable-load adjustment control signals $V_{CL-ADJ1}$-$V_{CL-ADJ4}$ to appropriately render the transistors Q240-Q246 conductive and non-conductive to control the constant current $I_{CL-CNST}$ to the next lowest of the fifteen possible discrete magnitudes of the constant current $I_{CL-CNST}$. After the beginning of the next half-cycle at step 442, the control circuit 140 measures the value of the conduction period $T_{CON}$ of the new half-cycle at step 444 and calculates a conduction-period-adjustment value $\Delta T_{CON}$ at step 446, i.e., $$\Delta T_{CON} = \left| \frac{T_{CON} - T_{CON-SS}}{T_{CON-SS}} \right|. \quad \text{(Equation 1)}$$

If the value of the conduction-period-adjustment value $\Delta T_{CON}$ is less than or equal to a maximum conduction-period-adjustment tolerance $\Delta T_{CON-MAX}$ (e.g., approximately 3%) at step 448, the control circuit 140 increments the counter y by one at step 450 to keep track of the number of half-cycles during which the conduction period $T_{CON}$ is within the tolerance of the steady-state conduction period $T_{CON-SS}$. If the conduction-period-adjustment value $\Delta T_{CON}$ is greater than the maximum conduction-period-adjustment tolerance $\Delta T_{CON-MAX}$ at step 448, the control circuit 140 increments the counter z by one at step 452 to keep track of the number of half-cycles during which the conduction period $T_{CON}$ is outside of the tolerance (i.e., 3%) of the steady-state conduction period $T_{CON-SS}$.

After incrementing the counter y at step 450 or the counter z at step 452, the control circuit 140 determines if the value of the counter y is greater than or equal to a maximum number $Y_{MAX}$ of half-cycles (e.g., approximately 20) at step 454 or if the value of the counter z is greater than or equal to a maximum number $Z_{MAX}$ of half-cycles (e.g., approximately 12) at step 456. If the value of the counter y is less than the maximum number $Y_{MAX}$ at step 454 and if the value of the counter z is less than the maximum number $Z_{MAX}$ at step 456, the controllable-load current adjustment procedure 400B loops around to measure the conduction period $T_{CON}$ at step 444 and calculate the conduction-period-adjustment value $\Delta T_{CON}$ once again at step 446. If the value of the counter y is greater than or equal to the maximum number $Y_{MAX}$ of half-cycles at step 454 and the constant current $I_{CL-CNST}$ is not equal to the minimum current $I_{CL-MIN}$ at step 458, the controllable-load current adjustment procedure 400B loops around to allow the control circuit 140 to decrease the magnitude of the constant current $I_{CL-CNST}$ of the controllable-load current $I_{CL}$ once again at step 440. If the constant current $I_{CL-CNST}$ is equal to the minimum current $I_{CL-MIN}$ at step 458, the controllable-load current adjustment procedure 400B simply exits. If the value of the counter z is greater than or equal to the maximum number $Z_{MAX}$ of half-cycles at step 456 (i.e., the control circuit 140 has determined that the constant current $I_{CL-CNST}$ of the controllable-load current $I_{CL}$ has been adjusted too low), the control circuit increases the constant current $I_{CL-CNST}$ back up to the next highest of the fifteen possible discrete magnitudes of the constant current $I_{CL-CNST}$ at step 460 and the controllable-load current adjustment procedure 400B exits. Alternatively, after the control circuit increases the constant current $I_{CL-CNST}$ back up to the next highest of the fifteen possible discrete magnitudes of the constant current $I_{CL-CNST}$ at step 460, the controllable-load current procedure 400B could include additional verification to confirm that the constant current $I_{CL-CNST}$ of the controllable-load current $I_{CL}$ has been increased sufficiently (e.g., in a manner similar to steps 442 through 456).

During the controllable-load current adjustment procedure 400B, the control circuit 140 of the LED driver 102 is further operable to maintain the light intensity of the LED light source 104 at a constant intensity while the constant current $I_{CL-CNST}$ of the controllable-load current $I_{CL}$ is adjusted such that any user-perceivable changes in the intensity are avoided. In other words, the length of the conduction period $T_{CON}$ of the phase-control voltage $V_{PC}$ (via the scaled phase-control voltage control signal $V_{PC-S}$) may change in response to the reductions of the constant current $I_{CL-CNST}$ of the controllable-load current $I_{CL}$, (as described above). However, the control circuit 140 is operable to disregard such changes in the conduction period $T_{CON}$ during the controllable-load current adjustment procedure 400B in order to maintain the light intensity of the LED light source 104 at a constant intensity.

Figure 11:
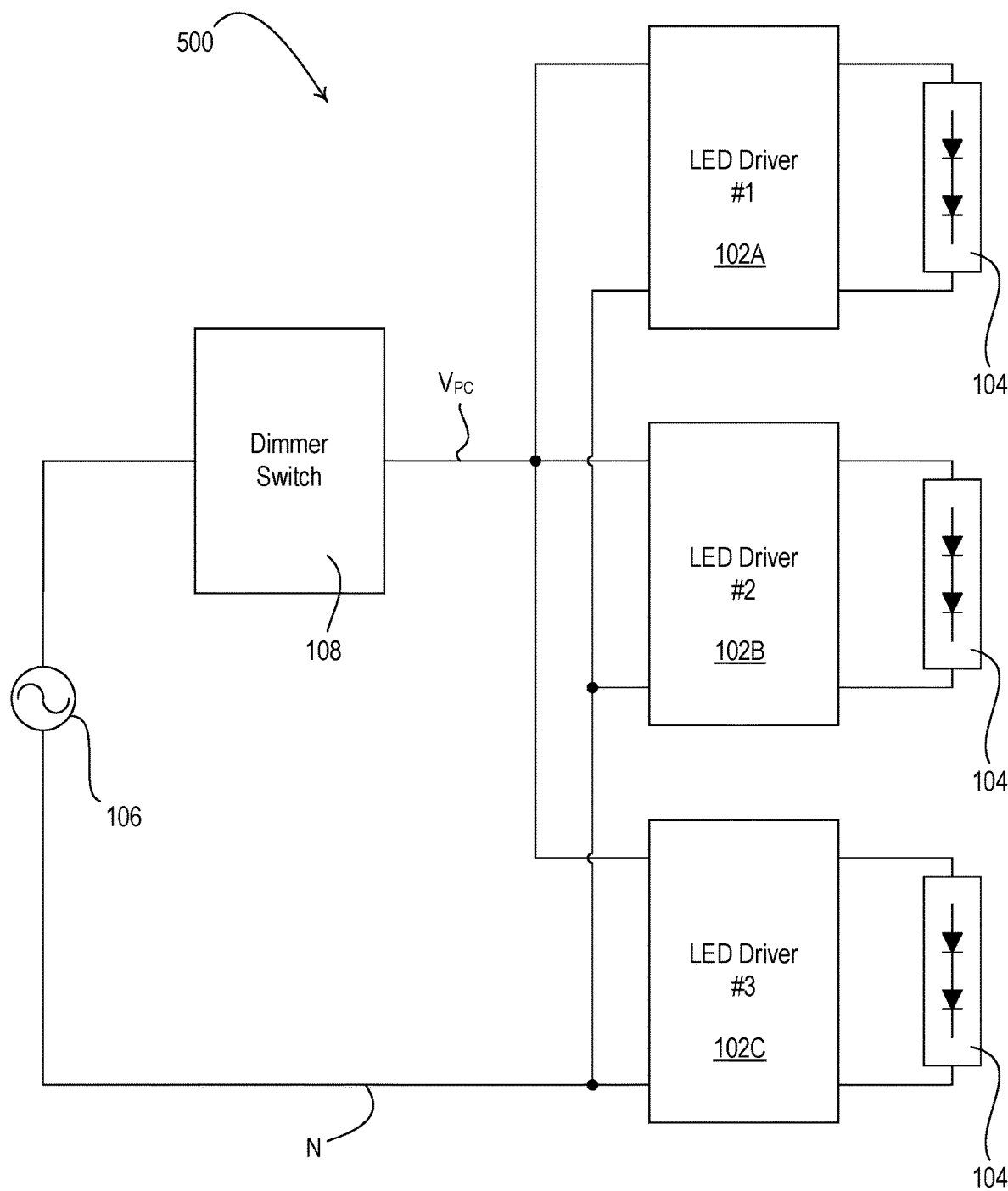
FIG. 11 is a simplified block diagram of a load control system including a dimmer switch and multiple LED drivers for controlling the intensity of respective LED light sources according to a second embodiment of the present invention.

FIG. 11 is a simplified block diagram of a load control system 500 including the dimmer switch 108 and multiple LED drivers 102A, 102B, 102C for controlling the intensity of respective LED light sources 104 according to a second embodiment of the present invention. The LED drivers 102A, 102B, 102C are coupled in parallel and each operate in an identical fashion as the LED driver 102 of the first embodiment so as to control the intensity of the respective LED light sources 104 in unison in response to the single phase-control voltage $V_{PC}$ generated by the dimmer switch 108. The LED drivers 102A, 102B, 102C are each operable to controllably conduct the controllable-load current $I_{CL}$ through the thyristor of the dimmer switch 108, such that the magnitude of the total current conducted through the thyristor of the dimmer switch 108 is the sum of the magnitudes of the respective controllable-load currents $I_{CL}$ of the LED drivers. The LED drivers 102A, 102B, 102C may each be operable to conduct the respective controllable-load current $I_{CL}$ when the phase-control voltage $V_{PC}$ received from the dimmer switch 108 is a forward phase-control waveform, and not to conduct the controllable-load current $I_{CL}$ when the phase-control voltage $V_{PC}$ is a reverse phase-control waveform. In addition, the LED drivers 102A, 102B, 102C are each operable to reduce the magnitude of the constant current $I_{CL-CNST}$ of the respective controllable-load current $I_{CL}$ independently of each other, such that the total magnitude of the total current conducted through the thyristor of the dimmer switch 108 can be accordingly reduced per procedure 700 previously described with respect to the first embodiment.

According to a third embodiment of the present invention, the LED drivers 102A, 102B, and 102C may be operable to communicate with one another via the respective communication circuit 170 in order to reduce the total current conducted through the thyristor of the dimmer switch 108 to the lowest magnitude. For example, the LED drivers 102A, 102B, 102C may be operable to transmit and receive digital messages via a communication link (not shown), such as a wired communication link or a wireless communication link, for example, a radio-frequency (RF) communication link or an infrared (IR) communication link. Examples of a load control system having a communication link are described in greater detail in co-pending, commonly-assigned U.S. patent application Ser. No. 11/644,652, filed Dec. 22, 2006, entitled METHOD OF COMMUNICATING BETWEEN CONTROL DEVICES OF A LOAD CONTROL SYSTEM, and in U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, the entire disclosures of which are hereby incorporated by reference.

According to the third embodiment, each LED driver 102A, 102B, 102C is operable to independently reduce the magnitude of the constant current $I_{CL\text{-}CNST}$ of the respective controllable-load current $I_{CL}$ using the target light level measurement procedure 400A (FIG. 9) and the controllable-load current adjustment procedure 400B (FIG. 10) of the first embodiment of the present invention. However, each LED driver 102A, 102B, 102C is also operable to transmit and receive simple digital messages before each LED driver begins the controllable-load current adjustment procedure 400B. Thus, each LED driver 102A, 102B, 102C can gradually reduce the magnitude of the constant current $I_{CL\text{-}CNST}$ of the respective controllable-load current $I_{CL}$ one at a time, such that the magnitude of the constant current is efficiently optimized for the load control system 500. According to the third embodiment of the present invention, the minimum amount of current $I_{CL\text{-}MIN}$ may be zero amps.

For example, in response to a change to the target intensity $L_{TRGT}$, LED driver 102A may first gradually reduce the magnitude of the constant current $I_{CL\text{-}CNST}$ of the respective controllable-load current $I_{CL}$ flowing through LED driver 102A. Since LED drivers 102B, 102C may also be conducting a respective controllable-load current $I_{CL}$, LED driver 102A may be operable to reduce the magnitude of the constant current $I_{CL\text{-}CNST}$ of its respective controllable-load current $I_{CL}$ to approximately zero amps. Then LED driver 102B may gradually reduce the magnitude of the constant current $I_{CL\text{-}CNST}$ of the respective controllable-load current $I_{CL}$ flowing through LED driver 102B to approximately zero amps since LED driver 102C may still be conducting its respective controllable-load current $I_{CL}$. Finally, LED driver 102C may begin to reduce the magnitude of the constant current $I_{CL\text{-}CNST}$ of its respective controllable-load current $I_{CL}$. However, since the LED driver 102C is the only LED driver that is still conducting the controllable-load current $I_{CL}$, the LED driver 102C may not be able to reduce the magnitude of the current to zero amps. Rather, the LED driver 102C would be operable to determine the minimum amount of controllable-load current $I_{CL}$ to be conducted through the thyristor of the dimmer switch 108 in a similar manner as the LED driver 102 of the first embodiment.

If each LED driver 102A, 102B, 102C were to simultaneously begin to reduce the magnitude of its respective controllable-load current $I_{CL}$ in response to detecting a change in the target intensity $L_{TRGT}$ (as may occur according to the second embodiment), the magnitude of the constant current may not be fully optimized. For example, if each LED driver 102A, 102B, 102C of the second embodiment reduces the magnitude of the constant current $I_{CL\text{-}CNST}$ of the respective controllable-load current $I_{CL}$ too much (such that the thyristor no longer remains latched), all three LED drivers 102A, 102B, 102C may then subsequently increase the magnitude of the controllable-load current whereas only a single LED driver may actually need to increase the magnitude of its controllable-load current. Thus, by ensuring that each LED driver 102A, 102B, and 102C reduces the magnitude of the constant current $I_{CL\text{-}CNST}$ of the respective controllable-load current $I_{CL}$ one at a time (via the transmission and reception of simple digital messages) according to the third embodiment, the minimum amount of current needed to ensure that the thyristor of the dimmer switch 108 remains latched can be reached.

Figure 12:
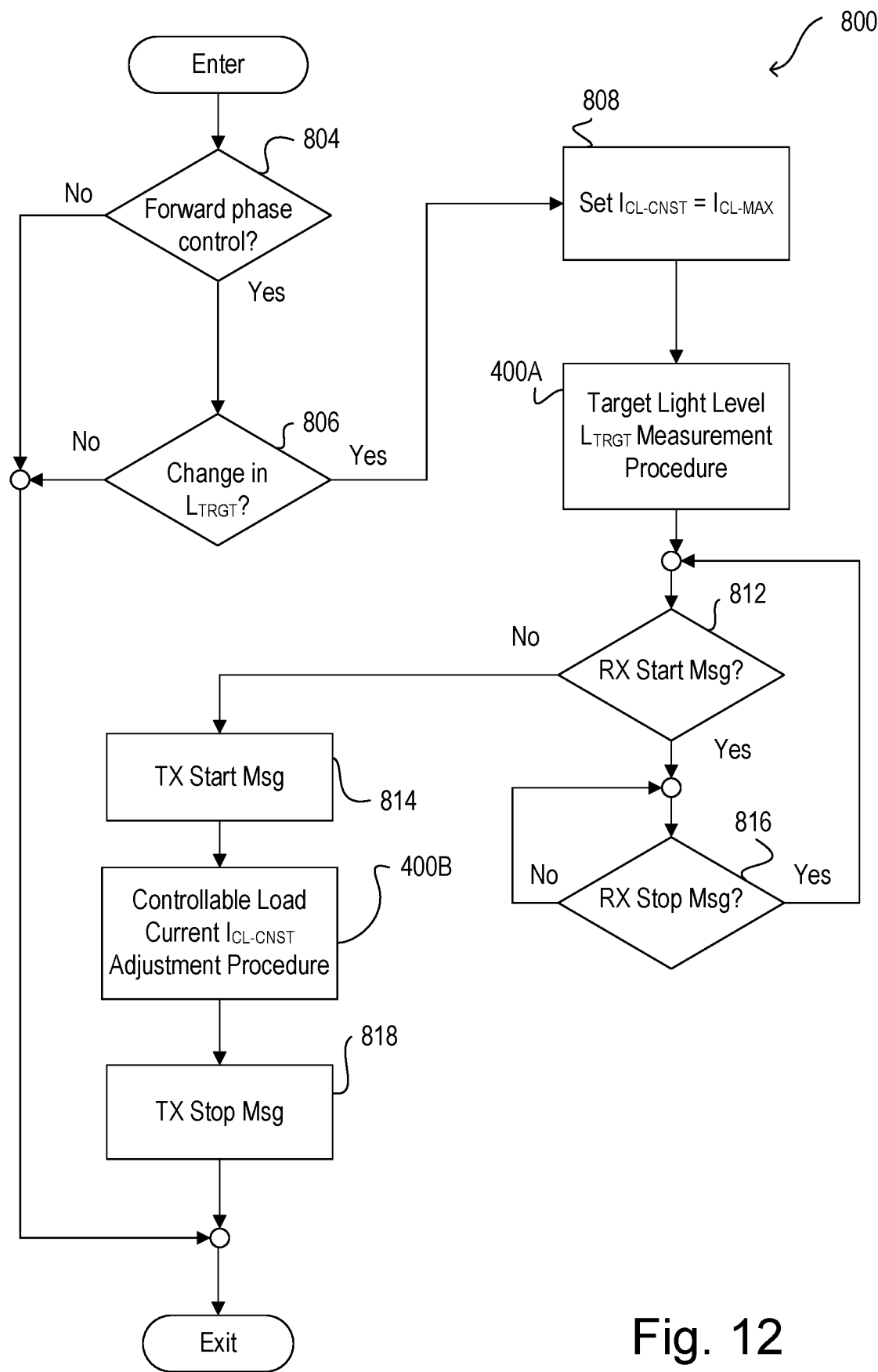
FIG. 12 is a simplified flowchart of a controllable-load current procedure executed by a control circuit of the LED driver according to a third embodiment of the present invention.

FIG. 12 is a simplified flowchart of a controllable-load current procedure 800 executed by each respective control circuit 140 of the LED drivers 102A, 102B, 102C according to the third embodiment of the present invention. The controllable-load current procedure 800 of the third embodiment is similar to the controllable-load current procedure 700 of the first embodiment. If the phase-control voltage $V_{PC}$ is a reverse phase-control waveform at step 804, the controllable-load current procedure 800 simply exits. However, if the phase-control voltage $V_{PC}$ is a forward phase-control waveform at step 804, then each respective control circuit 140 of the LED drivers 102A, 102B, 102C determines whether there is a change in the target intensity $L_{TRGT}$ at step 806. If there is no change, then the controllable-load current procedure 800 exits. Otherwise, each respective control circuit 140 of the LED drivers 102A, 102B, 102C controls the magnitude of the constant current $I_{CL\text{-}CNST}$ of the controllable-load current $I_{CL}$ to the maximum current $I_{CL\text{-}MAX}$ at step 808 (to ensure that the thyristor of the dimmer switch 108 remains conductive as the target intensity $L_{TRGT}$ changes).

Next, each respective control circuit 140 of the LED drivers 102A, 102B, 102C executes the target light level measurement procedure 400A previously described. Once the target light measurement procedure 400A is completed, the target intensity $L_{TRGT}$ is considered by each control circuit 140 to be stabilized (i.e., the phase control signal $V_{PC}$ is no longer changing in response to user adjustment at the dimmer switch 108). Then, each respective control circuit 140 of the LED drivers 102A, 102B, 102C checks whether a start adjustment message has been received via the communication link at step 812. The start adjustment message indicates whether one of the LED drivers 102A, 102B, 102C has begun the controllable-load current adjustment procedure 400B. Step 812 may also include a randomized wait period (i.e., a random back-off period) to prevent each respective control circuit 140 of the LED drivers 102A, 102B, 102C from simultaneously progressing to step 814 described in greater below. The random back-off period would be generated from a unique number, such as a serial number, stored in the respective memory 160 of each LED driver 102A, 102B, 102C.

If one of the control circuits, for example, the control circuit 140 of the LED driver 102A, has not received a start adjustment message from the other respective control circuits of LED drivers 102B, 102C at step 812 (and if control circuit of the LED driver 102A has the shortest randomized wait period), then the control circuit 140 of LED driver 102A transmits the start adjustment message at step 814. Once the control circuit 140 of the LED driver 102A transmits the start adjustment message, the respective control circuits 140 of the LED drivers 102B, 102C receive the start adjustment message at step 812 shortly thereafter. The control circuits 140 of the LED drivers 102B, 102C then wait to receive a stop adjustment message at step 816. The stop adjustment message indicates that one of the LED drivers 102A, 102B, 102C has completed the controllable-load current adjustment procedure 400B.

While the respective control circuits 140 of the LED drivers 102B, 102C are waiting at step 816, the control circuit 140 of the LED driver 102A executes the controllable-load current adjustment procedure 400B to reduce the magnitude of the constant current $I_{CL\text{-}CNST}$ of the respective controllable-load current $I_{CL}$ through the LED driver 102A to the lowest possible magnitude. Because the remaining control circuits 140 of LED drivers 102B, 102C are still controlling the magnitude of the constant current $I_{CL\text{-}CNST}$ of the controllable-load current $I_{CL}$ to the maximum current $I_{CL-MAX}$ (from step 808), the control circuit 140 of the LED driver 102A may be able to reduce the magnitude of the constant current $I_{CL-CNST}$ of the controllable-load current $I_{CL}$ through the LED driver 102A to the minimum current $I_{CL-MIN}$. When the controllable-load current adjustment procedure 400B is complete, the control circuit 140 of the LED driver 102A transmits the stop adjustment message via the communication link at step 818 before the control circuit 140 exits the controllable-load current procedure 800.

When the control circuit 140 of the LED driver 102A transmits the stop adjustment message at step 818, the remaining respective control circuits 140 of the LED drivers 102B, 102C receive the stop adjustment message at step 816. Then, the remaining control circuits 140 of the LED drivers 102B, 102C check whether another start adjustment message has been received via the communication link at step 812. If a start adjustment message has not been received at step 812, one of the control circuits, for example, the control circuit 140 of LED driver 102B (having a shorter randomized wait period than the LED driver 102C), transmits the start adjustment message at step 814 before beginning the controllable-load current adjustment procedure 400B. Once the control circuit 140 of the LED driver 102C receives the start adjustment message from the LED driver 102B, the control circuit 140 of the LED driver 102C waits at step 816 to receive the stop adjustment message.

The control circuit 140 of the LED driver 102B completes the controllable-load current adjustment procedure 400B to gradually reduce the magnitude of the constant current $I_{CL-CNST}$ of the controllable-load current $I_{CL}$ through the LED driver 102B to the lowest possible magnitude. Again because the remaining LED driver 102C is still controlling the magnitude of the constant current $I_{CL-CNST}$ of the controllable-load current $I_{CL}$ to the maximum current $I_{CL-MAX}$ (from step 808), the control circuit 140 of the LED driver 102B may be able to reduce the respective magnitude of the constant current $I_{CL-CNST}$ of the controllable-load current $I_{CL}$ (through the LED driver 102B) to the minimum current $I_{CL-MIN}$. After completing the controllable-load adjustment procedure 400B, the control circuit 140 of the LED driver 102B transmits the stop adjustment message at step 818 before the control circuit 140 exits the controllable-load current procedure 800.

When the LED driver 102B transmits the stop adjustment message at step 818, the remaining control circuit 140 of the LED driver 102C receives the stop adjustment message at step 816. Then, the control circuit 140 of the LED driver 102C checks whether another start adjustment message has been received via the communication link at step 812. If no start adjustment message has been received at step 812, then finally, the control circuit 140 of the LED driver 102C transmits the start adjustment message at step 814 before beginning the controllable-load current adjustment procedure 400B, transmits the stop adjustment message at step 818, and exits controllable-load current procedure 800. Because the control circuit 140 of the LED driver 102C may be the only control circuit in the load control system 500 that is still controlling the magnitude of the constant current $I_{CL-CNST}$ of the controllable-load current $I_{CL}$ to a non-minimum current value, the control circuit may not be able to completely reduce the magnitude of the constant current $I_{CL-CNST}$ of the controllable-load current $I_{CL}$ through the LED driver 102C to the minimum current $I_{CL-MIN}$. However, the controllable-load current adjustment procedure 400B provides that the control circuit 140 of the LED driver 102C determines the lowest possible magnitude of the constant current $I_{CL-CNST}$ of the controllable-load current $I_{CL}$ while still ensuring proper operation of the thyristor of the dimmer switch 108.

Figure 13:
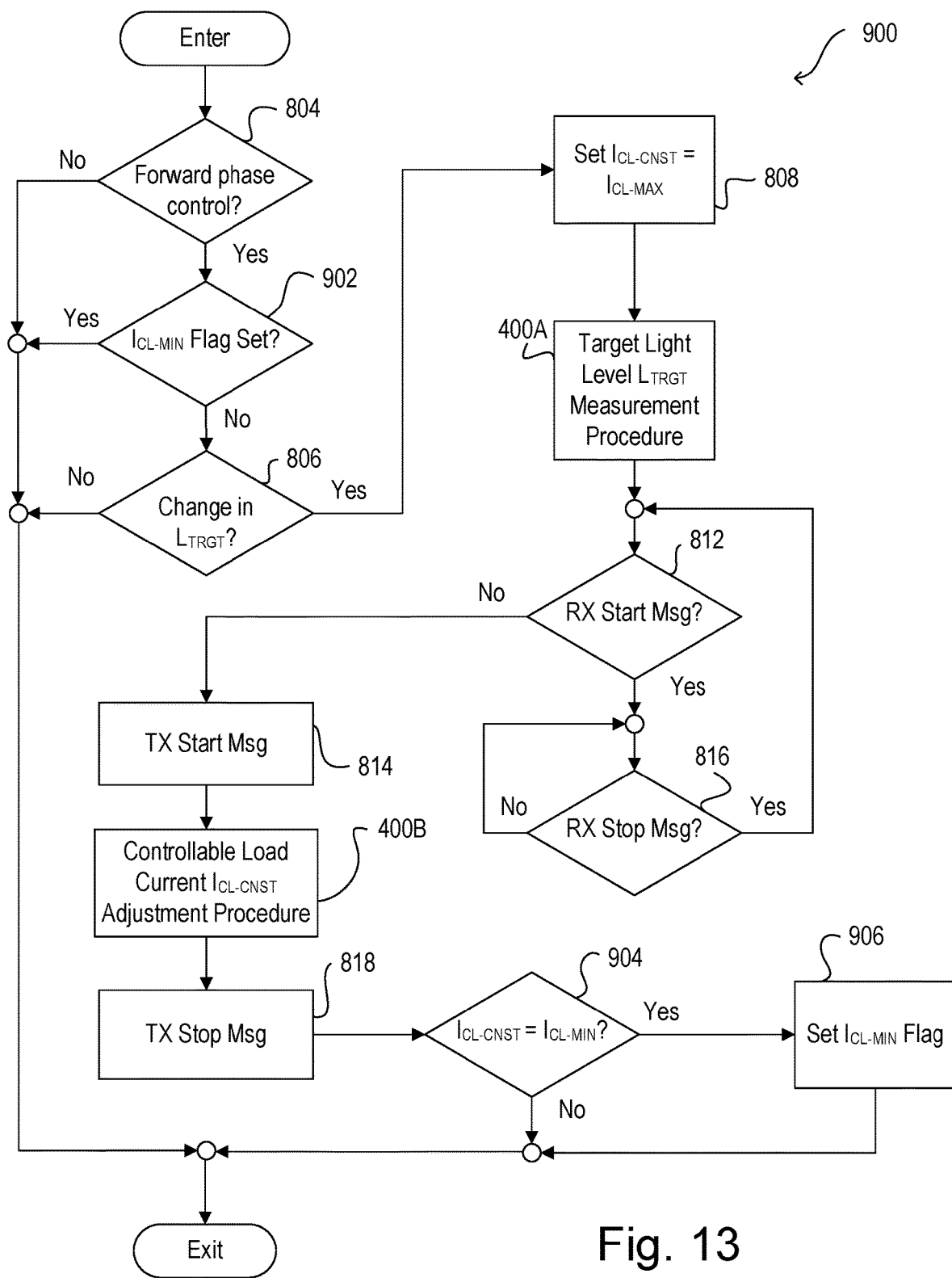
FIG. 13 is a simplified flowchart of a controllable-load current procedure executed by a control circuit of the LED driver according to a fourth embodiment of the present invention.

FIG. 13 is a simplified flowchart of a controllable-load current procedure 900 executed by a control circuit of the LED driver according to a fourth embodiment of the present invention. According to the fourth embodiment, the LED drivers 102A, 102B, and 102C may be operable to communicate with one another in a similar manner as described in the third embodiment. However, the LED drivers 102A, 102B, 102C of the fourth embodiment operate such that if one of the LED drivers has reduced the magnitude of the constant current $I_{CL-CNST}$ of the controllable-load current $I_{CL}$ to the minimum value $I_{CL-MIN}$ (i.e., zero amps), that one of the LED drivers will no longer communicate with the other LED drivers or execute the controllable-load current adjustment procedure 400B on a regular basis. For example, if the LED driver 102C becomes the only driver in the load control system 500 that is still controlling the magnitude of the constant current $I_{CL-CNST}$ of the controllable-load current $I_{CL}$ to a non-minimum current value, LED driver 102C becomes the only LED driver that continues to execute the controllable-load current adjustment procedure 400B during the controllable-load current procedure 900. In other words, LED drivers 102A and 102B may essentially 'drop-out' from the controllable-load current procedure 900 once they have reduced the magnitude of the constant current $I_{CL-CNST}$ of the controllable-load current $I_{CL}$ to the minimum value $I_{CL-MIN}$ such that LED driver 102C becomes the only driver that continues to adjust the magnitude of the constant current $I_{CL-CNST}$ of the controllable-load current $I_{CL}$ on a regular basis as further described below.

The controllable-load current procedure 900 of the fourth embodiment is very similar to the controllable-load current procedure 800 of the third embodiment. The controllable-load current procedure 900 includes the use of a minimum controllable-load current $I_{CL-MIN}$ flag to indicate whether the LED drivers 102A, 102B, 102C are controlling the magnitude of the constant current $I_{CL-CNST}$ of the controllable-load current $I_{CL}$ to the minimum value. After determining that the phase-control voltage $V_{PC}$ is a forward phase-control waveform at step 804, each respective control circuit 140 of the LED drivers 102A, 102B, 102C will check whether the minimum controllable-load current $I_{CL-MIN}$ flag is set at step 902. When each respective control circuit 140 of the LED drivers 102A, 102B, 102C first executes the controllable-load current procedure 900, the minimum controllable-load current $I_{CL-MIN}$ flag is not set, thus each control circuit will execute steps 806-818 and procedures 400A, 400B in a similar manner as described above with respect to the controllable-load current procedure 800 of the third embodiment.

However, after each respective control circuit 140 of the LED drivers 102A, 102B, 102C transmits the stop adjustment message at step 818, each control circuit determines whether the magnitude of the constant current $I_{CL-CNST}$ of the respective controllable-load current $I_{CL}$ (as a result of the controllable load current adjustment procedure 400B) is being controlled to the minimum value $I_{CL-MIN}$ at step 904. If the respective control circuit 140 of LED drivers 102A, 102B, 102C is controlling the controllable current to the minimum value, then the control circuit sets the minimum controllable-load current $I_{CL-MIN}$ flag at step 906 before exiting the controllable-load current procedure 900. Otherwise, each control circuit 140 of the LED drivers 102A, 102B, 102C simply exits the controllable-load current procedure 900 without setting the minimum controllable-load current $I_{CL-MIN}$ flag.

Thus, if the LED driver 102C becomes the only driver that is still controlling the magnitude of the constant current $I_{CL-CNST}$ of the controllable-load current $I_{CL}$ to a non-minimum current value, the respective control circuits 140 of LED drivers 102A and 102B will have set the minimum controllable-load current $I_{CL-MIN}$ flag, whereas the control circuit of LED driver 102C will not have set the $I_{CL-MIN}$ flag. As a result, the next time that the controllable-load current procedure 900 is executed by the control circuits 140 of the LED drivers 102A, 102B, 102C, the control circuits of LED drivers 102A and 102B will determine that the minimum controllable-load current $I_{CL-MIN}$ flag is set at step 902, and will immediately exit the procedure 900 (i.e., "dropping out"). Further, since the control circuit 140 of the LED driver 102C has not set the minimum controllable-load current $I_{CL-MIN}$ flag, LED driver 102C will continue to control the controllable load current according to steps 806-818, 904-906, and procedures 400A, B of the controllable-load current procedure 900.

Alternatively, the LED drivers 102A, 102B, 102C may not reduce the magnitude of the constant current $I_{CL-CNST}$ in an incremental fashion (i.e., to one of the plurality of magnitudes between the maximum current $I_{CL-MAX}$ and approximately zero amps). The LED drivers 102A, 102B, 102C may be operable to simply decrease (i.e., step) the magnitude of the constant current $I_{CL-CNST}$ from the initial magnitude (i.e., the maximum current $I_{CL-MAX}$) to approximately zero amps. The LED drivers 102A, 102B, 102C would each be operable to subsequently monitor the length of the conduction period $T_{CON}$ to determine if there have been any changes in the length of the conduction period $T_{CON}$, and to increase the magnitude of the constant current $I_{CL-CNST}$ back to the maximum current $I_{CL-MAX}$ if the length of the conduction period $T_{CON}$ has changed. Accordingly, when operating together as part of the lighting control system, the LED drivers 102A, 102B, 102C would one-by-one decrease the magnitude of the constant current $I_{CL-CNST}$ to approximately zero amps (i.e., disable the respective controllable-load circuits 180) until the last LED driver determines that the magnitude of the constant current $I_{CL-CNST}$ must remain at the maximum current $I_{CL-MAX}$ in order to conduct enough current through the thyristor of the dimmer switch 108 to exceed the rated latching and holding currents of the thyristor.

According to a fifth embodiment of the present invention, the LED drivers 102A, 102B, 102C may be operable to determine a total number $N_{TOTAL}$ of LED drivers in the load control system 500 by transmitting and receiving digital messages via a discovery process that is executed, for example, upon power-up. Then, each LED driver 102A, 102B, 102C can determine the appropriate magnitude of the constant current $I_{CL-CNST}$ of the controllable-load current $I_{CL}$ that each of the LED drivers should conduct, such that the magnitude of the total current conducted through the thyristor of the dimmer switch 108 will exceed the rated latching and holding currents of the thyristor. For example, each of the LED drivers 102A, 102B, 102C may control the magnitude of the respective constant current $I_{CL-CNST}$ as a function of the maximum current $I_{CL-MAX}$ and the total number $N_{TOTAL}$ of LED drivers in the load control system 500, e.g., $$I_{CL-CNST} = I_{CL-MAX}/N_{TOTAL}. \quad \text{(Equation 2)}$$

Accordingly, the magnitude of the total current conducted through the thyristor of the dimmer switch 108 is reduced to a low magnitude, and power is not needlessly dissipated in each of the LED drivers 102A, 102B, 102C.

Figure 14:
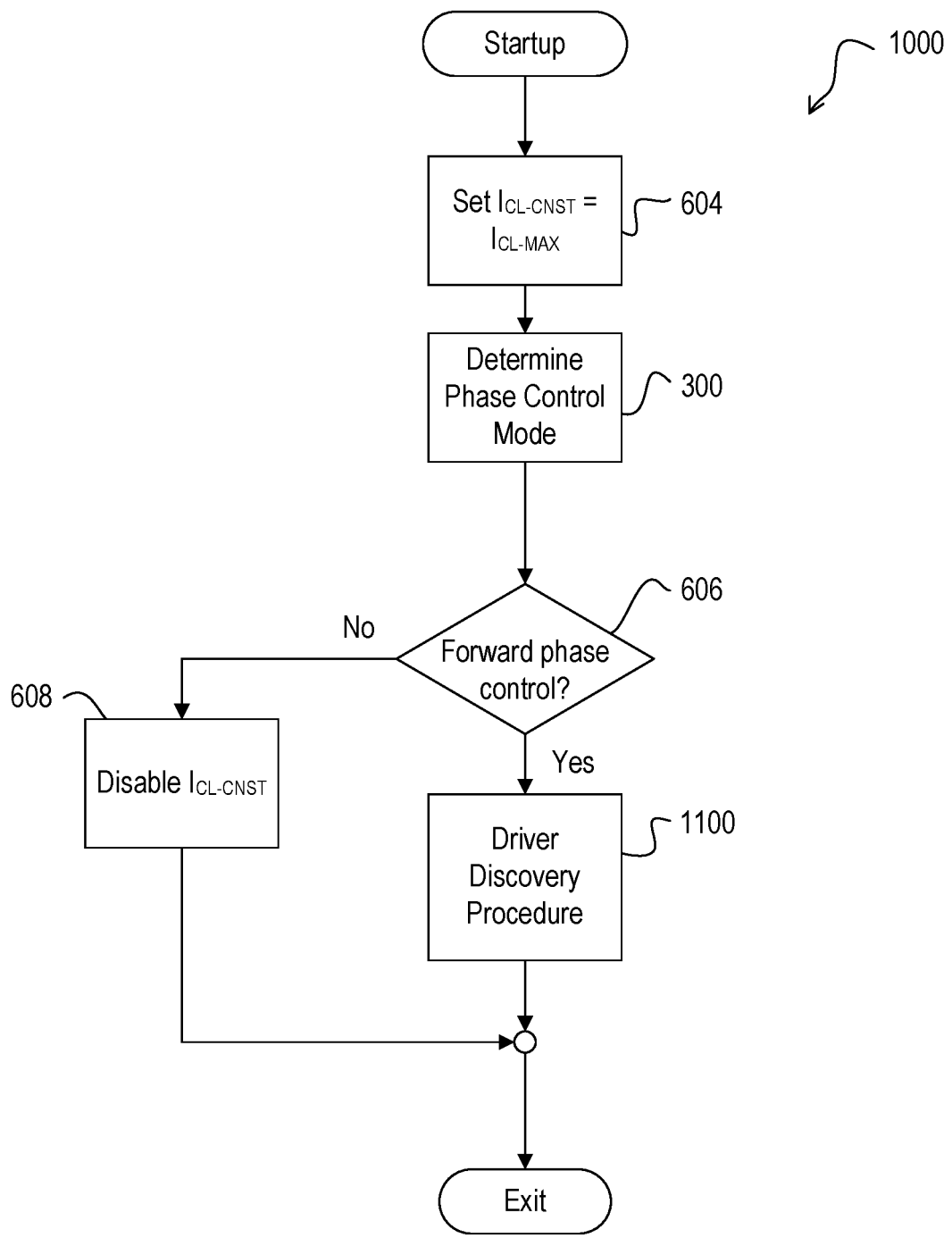
FIG. 14 is a simplified flowchart of a startup procedure executed by a control circuit of the LED driver according to a fifth embodiment of the present invention when power is first applied to the LED driver.
Figure 15:
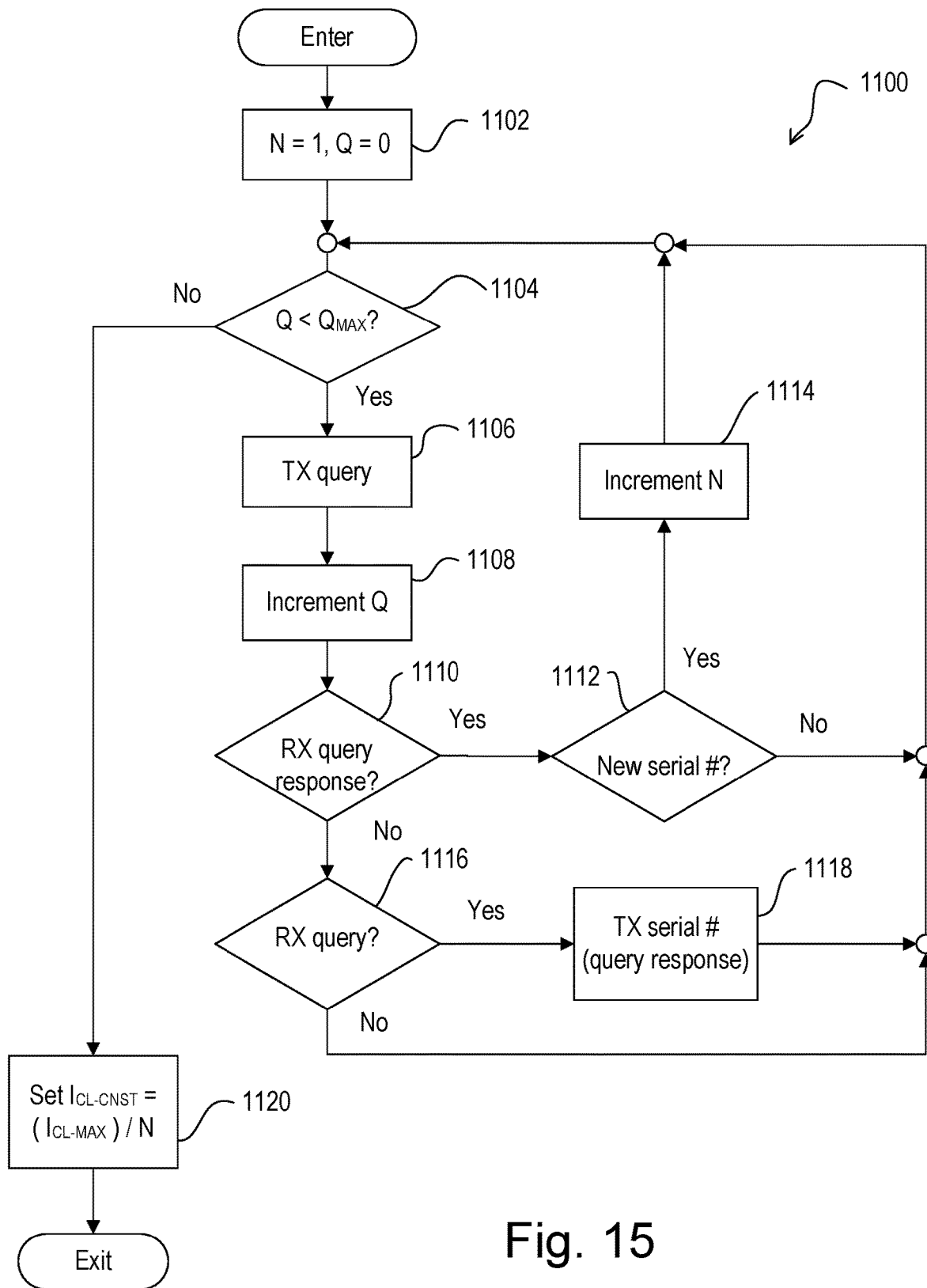
FIG. 15 is a simplified flowchart of an LED driver discovery procedure executed by a control circuit of the LED driver according to the fifth embodiment of the present invention.

FIG. 14 is a simplified flowchart of a startup procedure 1000, and FIG. 15 is a simplified flowchart of an LED driver discovery procedure 1100 executed by a control circuit 140 of the LED driver 102A, 102B, 102C according to the fifth embodiment. The startup procedure 1000 is very similar to the startup procedure 600 of the first embodiment. However, once each respective control circuit 140 has determined that the phase-control voltage $V_{PC}$ is a forward phase-control waveform at step 606, then each control circuit executes the LED driver discovery procedure 1100 to determine the total number $N_{TOTAL}$ of LED drivers in the load control system 500.

At step 1102 of the LED driver discovery procedure 1100 as shown in FIG. 15, each respective control circuit 140 initializes the total number $N_{TOTAL}$ of LED drivers to one (i.e., each LED driver counts itself) and a query counter Q to zero. The query counter Q is used to count the number of query attempts, and at step 1104, each respective control circuit 140 determines whether the query counter Q is less than a maximum number of queries $Q_{MAX}$ (e.g., 5). If the query counter Q is less than the maximum number of queries $Q_{MAX}$, then the control circuit 140 transmits a query message (i.e., a "who's there?" message) via the communication link to determine whether there are other LED drivers in the load control system 500. After transmitting the query message, each respective control circuit 140 increments the query counter at step 1108, and checks to see whether a response to the query message has been received at step 1110. The query message response will include a unique identifier of each LED driver 102A, 102B, 102C such as a serial number stored in each respective memory 160. If a query message response has been received at step 1110, then the control circuit 140 confirms whether the query message response contains a new serial number at step 1112. If the serial number is new at step 1112, then the control circuit 140 will increment the total number $N_{TOTAL}$ of LED drivers at step 1114 before looping back to step 1104 to check the query counter again. If the serial number is not new at step 1112, then the control circuit simply loops back to step 1104. In other words, each LED driver 102A, 102B, 102C checks the serial number of the query message response to ensure that the same LED driver is not counted more than once when determining the total number $N_{TOTAL}$ of LED drivers.

If the control circuit 140 does not receive a query message response at step 1110, then the control circuit determines whether it has received a query message from another control circuit at step 1116. If the control circuit 140 has received a query message, then the control circuit sends a query message response (including its respective serial number or unique identifier) at step 1118 before looping back to step 1104 to check the query counter again. Otherwise, the control circuit simply loops back to step 1104. Once the query counter Q is no longer less than the maximum number of queries $Q_{MAX}$ at step 1104, each respective control circuit 140 calculates the respective constant current $I_{CL-CNST}$ as a function of the maximum current $I_{CL-MAX}$ and the total number $N_{TOTAL}$ of LED drivers in the load control system 500 at step 1120 before exiting procedure 1100. Thus, the fifth embodiment does not require each respective control circuit 140 of the LED drivers 102A, 102B, 102C to regularly execute a controllable-load current procedure as discussed in the previous embodiments.

According to an alternate embodiment, the LED drivers 102A, 102B, 102C may be operable to communicate with a master control device via their respective communication circuits 170. The master control device may be operable to send digital messages to each LED driver 102A, 102B, 102C to instruct the LED drivers as to the appropriate magnitude of the constant current $I_{CL\text{-}CNST}$ of the respective controllable-load current $I_{CL}$ that each LED driver should conduct. The master control device may be implemented as a smart dimmer switch, a handheld programming device (for example, a personal digital assistant or a smart cellular telephone), a central controller (for example, a main repeater device for a wireless load control system), or any type of suitable master control device. Alternatively, one of the LED drivers 102A, 102B, 102C may be operable to act as the master control device through an arbitration process as is well known in the art. An example of such an arbitration process is described in greater detail in co-pending, commonly-assigned U.S. patent application Ser. No. 11/672,884, filed Feb. 8, 2007, entitled COMMUNICATION PROTOCOL FOR A LIGHTING CONTROL SYSTEM, the entire disclosure of which is hereby incorporated by reference.

While the present invention has been described with reference to the LED drivers 102, 102A, 102B, 102C for controlling the intensity of respective LED light sources 104, the controllable-load circuit 180 disclosed herein could be used in other load control devices, such as electronic dimming ballasts for controlling fluorescent lamps, or motor control devices for controlling motor loads. In addition, the controllable-load circuit 180 need not be implemented as part of the load control device (i.e., as part of the LED driver 102), but could be included in a separate enclosure and simply electrically coupled to the dimmer switch 108 of the load control system 100. Further, the controllable-load circuit 180 could alternatively be implemented as a digital potentiometer or a suitable equivalent.

In addition, while the phase control determination procedure 300 disclosed herein is performed by the LED drivers 102, 102A, 102B, 102C in order to appropriately control the controllable-load circuit 180, the phase control determination procedure could alternatively be performed to provide other capabilities. For example, the phase control determination procedure could be used to properly control the LED drive circuit with an appropriate dimming range in response to determining whether the phase control signal is a forward or reverse phase control waveform. For example, once an LED driver has determined that the phase-control voltage $V_{PC}$ is a forward phase-control waveform, the LED driver can operate in a forward phase control mode and use a forward phase control dimming range when controlling the LED drive circuit.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A light-emitting diode (LED) drive system, comprising:
    input terminals to receive a phase-control voltage from a dimmer switch;
    output terminals to provide an output voltage;
    an LED drive control circuit to determine whether the received phase-control voltage comprises a forward phase-control waveform or a reverse phase-control waveform; and
    a selectively enablable controllable-load circuit conductively coupled in parallel with an LED lighting load coupled to the output terminals and communicatively coupled to the LED drive control circuit, the controllable-load circuit to permit a controllable-load current to flow through the dimmer switch when enabled;
    wherein, responsive to the determination that the phase-control voltage is a forward phase-control waveform, the LED drive control circuit to:
    enable the controllable-load circuit; and
    adjust a magnitude of the controllable-load current through the dimmer switch such that the controllable-load current exceeds at least one of:
        a rated latching current of the dimmer switch; or
        a rated holding current of the dimmer switch.

2. The electric load control system of claim 1 wherein, responsive to the determination that the phase-control voltage is a reverse phase-control waveform, the LED drive control circuit to further:
    disable the controllable-load circuit such that the controllable-load circuit does not conduct the controllable-load current through the dimmer switch.

3. The electric load control system of claim 1, the LED drive control circuit to monitor a magnitude of the phase-control voltage received from the dimmer switch to determine whether the phase-control voltage is the forward phase-control waveform or the reverse phase-control waveform.

4. The electric load control system of claim 1, the LED drive control circuit to compare the magnitude of the phase-control voltage to a voltage threshold after detecting a voltage transition of the phase-control voltage to determine whether the phase-control voltage is the forward phase-control waveform or the reverse phase-control waveform, the LED drive control circuit to determine the phase-control voltage is the forward phase-control waveform if the magnitude of the phase-control voltage is consistently larger than the voltage threshold.

5. A light-emitting diode drive method, comprising:
    determining, by an LED drive control circuit, whether a phase-control voltage received from a dimmer switch comprises a forward phase-control waveform or a reverse phase-control waveform; and
    responsive to the determination that the phase-control voltage is a forward phase-control waveform:
    selectively enabling, by the LED drive control circuit, a controllable-load circuit, the controllable-load circuit conductively coupled in parallel with an LED lighting load, the controllable-load circuit to permit a controllable-load current to flow through the dimmer switch when enabled;
    causing, by the LED drive control circuit, an adjustment of the controllable-load current through the dimmer switch such that the controllable-load current exceeds at least one of:
        a rated latching current of the dimmer switch; or
        a rated holding current of the dimmer switch.

6. The method of claim 5 further comprising:
    selectively disabling, by the LED drive circuit, the controllable-load circuit such that the controllable-load circuit does not conduct the controllable-load current through the dimmer switch.

7. The method of claim 5, further comprising:
    monitoring, by the LED drive circuit, a magnitude of the phase-control voltage received from the dimmer switch to determine whether the phase-control voltage is the forward phase-control waveform or the reverse phase-control waveform.

8. The method of claim 5, further comprising:
comparing, by the LED drive control circuit, the magnitude of the phase-control voltage to a voltage threshold responsive to detection of a voltage transition of the phase-control voltage to determine whether the phase-control voltage is the forward phase-control waveform or the reverse phase-control waveform; and
determining, by the LED drive control circuit, the phase-control voltage is the forward phase-control waveform responsive to the magnitude of the phase-control voltage being consistently larger than the voltage threshold.

9. A non-transitory, machine-readable, storage device that includes instructions that, when executed by a light-emitting diode (LED) drive control circuit, cause the LED drive circuit to:
determine whether a phase-control voltage received from a dimmer switch comprises a forward phase-control waveform or a reverse phase-control waveform; and
responsive to the determination by the LED drive control circuit that the phase-control voltage is a forward phase-control waveform:
selectively enable a controllable-load circuit, the controllable-load circuit conductively coupled in parallel with an LED lighting load, the controllable-load circuit to permit a controllable-load current to flow through the dimmer switch when enabled;
cause an adjustment of the controllable-load current through the dimmer switch such that the controllable-load current exceeds at least one of:
a rated latching current of the dimmer switch; or
a rated holding current of the dimmer switch.

10. The non-transitory, machine-readable, storage device of claim 9, wherein the instructions, when executed by the LED drive control circuitry, cause the LED drive control circuitry to further:
selectively disable the controllable-load circuit such that the controllable-load circuit does not conduct the controllable-load current through the dimmer switch.

11. The non-transitory, machine-readable, storage device of claim 9, wherein the instructions, when executed by the LED drive control circuitry, cause the LED drive control circuitry to further:
monitor a magnitude of the phase-control voltage received from the dimmer switch to determine whether the phase-control voltage is the forward phase-control waveform or the reverse phase-control waveform.

12. The non-transitory, machine-readable, storage device of claim 9, wherein the instructions, when executed by the LED drive control circuitry, cause the LED drive control circuitry to further:
compare the magnitude of the phase-control voltage to a voltage threshold responsive to detection of a voltage transition of the phase-control voltage to determine whether the phase-control voltage is the forward phase-control waveform or the reverse phase-control waveform; and
determine the phase-control voltage is the forward phase-control waveform responsive to the magnitude of the phase-control voltage being consistently larger than the voltage threshold.

* * * * *